United States Patent [19]

Ibaraki et al.

[11] Patent Number: 5,546,461
[45] Date of Patent: Aug. 13, 1996

[54] SCRAMBLE SYSTEM FOR USE IN DIGITAL VIDEO SIGNAL RECORDING AND REPRODUCING SYSTEM OR TRANSMISSION AND RECEIVING SYSTEM, COMPRISING SCRAMBLE APPARATUS AND DESCRAMBLE APPARATUS

[75] Inventors: Susumu Ibaraki, Toyonaka; Noboru Katta, Itami; Seiji Nakamura, Toyonaka; Hiroki Murakami, Osaka, all of Japan

[73] Assignee: Matsushita Electric Industrial Co., Ltd., Osaka, Japan

[21] Appl. No.: 225,330

[22] Filed: Apr. 8, 1994

[30] Foreign Application Priority Data

| Apr. 9, 1993 | [JP] | Japan | 5-083081 |
| Apr. 9, 1993 | [JP] | Japan | 5-083085 |
| Apr. 15, 1993 | [JP] | Japan | 5-088394 |
| Jun. 22, 1993 | [JP] | Japan | 5-150056 |
| Oct. 12, 1993 | [JP] | Japan | 5-254184 |

[51] Int. Cl.$^6$ .............. H04N 7/167; H04K 1/04
[52] U.S. Cl. .............. 380/20; 380/5; 380/20; 380/37
[58] Field of Search .............. 380/5, 14, 15, 380/17, 20, 37, 10, 21; 375/240; 358/335; 348/390

[56] References Cited

U.S. PATENT DOCUMENTS

| 3,958,081 | 5/1976 | Ehrsam et al. | 178/22 |
| 4,635,113 | 1/1987 | Okada et al. | 358/124 |
| 4,679,078 | 7/1987 | Wong et al. | 380/15 |
| 4,679,235 | 7/1987 | Okada et al. | 380/20 |
| 4,700,388 | 10/1987 | Okada et al. | 380/20 |
| 4,742,544 | 5/1988 | Kupnicki et al. | 380/14 |
| 4,815,129 | 3/1989 | Griffin et al. | 380/15 |
| 4,817,146 | 3/1989 | Szczutkowski et al. | 380/48 |
| 5,127,021 | 6/1992 | Schreiber | 380/34 |
| 5,185,794 | 2/1994 | Thompson et al. | 380/17 |
| 5,208,857 | 5/1993 | LeBrat | 380/14 |
| 5,335,275 | 8/1994 | Millar et al. | 380/4 |
| 5,377,266 | 12/1994 | Katta et al. | 380/20 |

FOREIGN PATENT DOCUMENTS

| 0027572 | 4/1981 | European Pat. Off. |
| 0454556 | 10/1991 | European Pat. Off. |
| 62-5510 | 2/1987 | Japan |
| 5-48997 | 7/1993 | Japan |

OTHER PUBLICATIONS

Yamamitsu et al., "A Study on Trick Plays for Digital VCR" IEEE Transactions on Consumer Electronics, vol. 37. No. 3, pp. 261–266, Aug. 1991.

Heinz Griesshaber, "Managing Secure and Confidential Video Distribution" IEEE Transactions on Consumer Electronics, vol. 37, No. 3, pp. 220–223, Aug. 1991.

U.S. patent application Ser No. 08/197490 Uchida et al.
U.S. patent application Ser. No. 08/197490 Uchida et al.

*Primary Examiner*—Stephen C. Buczinski
*Attorney, Agent, or Firm*—McDermott, Will & Emery

[57] ABSTRACT

A scramble system of the present invention including a scramble apparatus and a descramble apparatus is applied to a recording and reproducing system or a transmission and receiving system wherein a frame of a digital video signal composed of a plurality of frames is divided into a plurality of predetermined fundamental video blocks corresponding to recording and reproducing processes. Either one of the recording and reproducing system and the transmission and receiving system executes a reconstruction process such as an interpolation process, a high speed playback process or the like. The scramble apparatus executes a scramble process on the inputted digital video signal in the identical processing manner using the fundamental video blocks in the identical position in each of the frames and generates a scrambled video signal, while the descramble apparatus effects reverse conversion of the scramble process executed by the scramble apparatus using the fundamental video blocks on the scrambled video signal generated by the scramble apparatus.

23 Claims, 14 Drawing Sheets

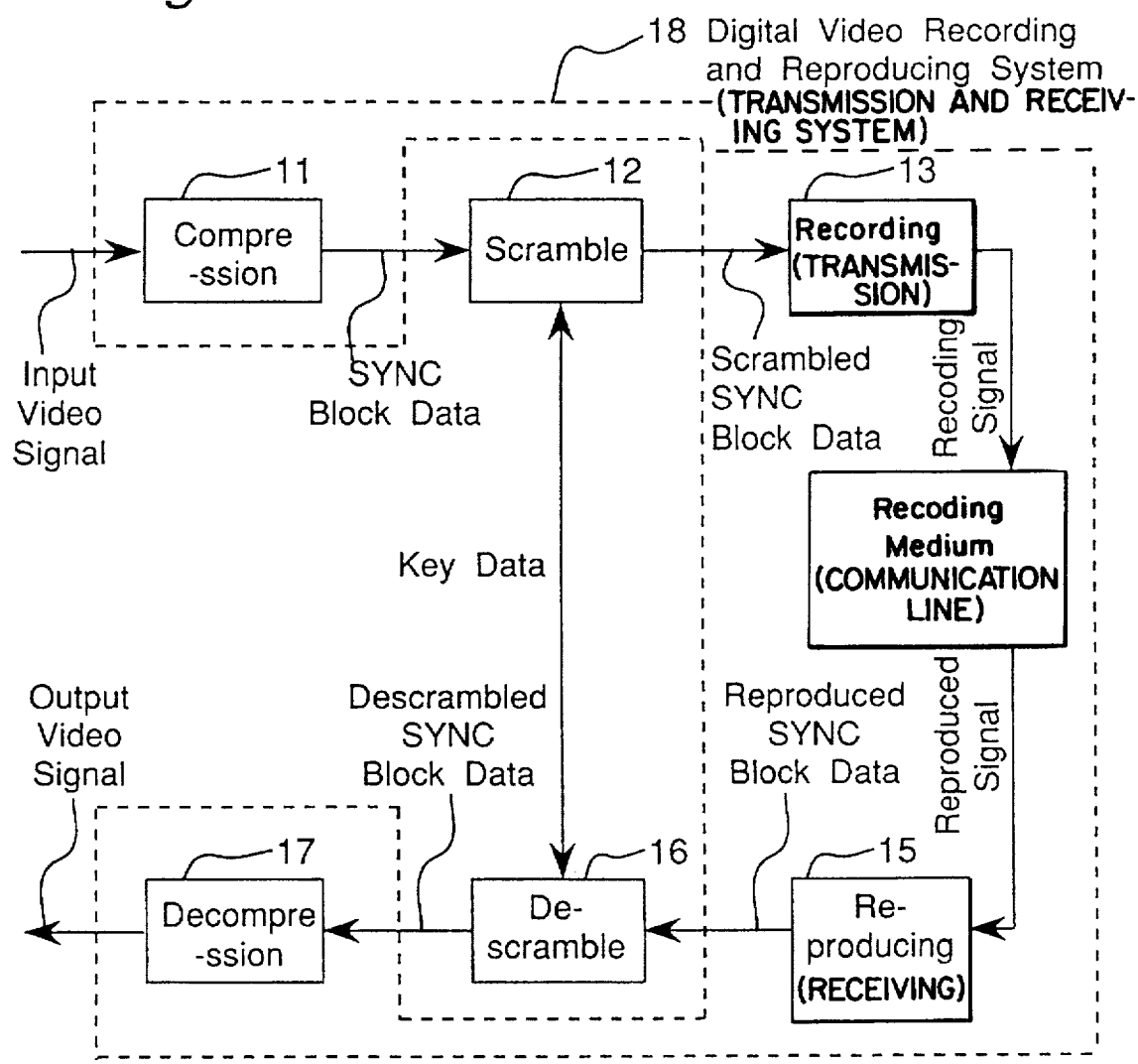

Fig.7A — Ai,Ci

| 0 | 11 | 12 | 23 | 24 |
| --- | --- | --- | --- | --- |
| 1 | 10 | 13 | 22 | 25 |
| 2 | 9 | 14 | 21 | 26 |
| 3 | 8 | 15 | 20 | |
| 4 | 7 | 16 | 19 | |
| 5 | 6 | 17 | 18 | |

Fig.7B — Bi,Di

| | 8 | 9 | 20 | 21 |
| --- | --- | --- | --- | --- |
| 0 | 7 | 10 | 19 | 22 |
| 1 | 6 | 11 | 18 | 23 |
| 2 | 5 | 12 | 17 | 24 |
| | 4 | 13 | 16 | 25 |
| | 3 | 14 | 15 | 26 |

Fig.7C — Ei

| 0 | 11 | 12 | 23 | 24 |
| --- | --- | --- | --- | --- |
| 1 | 10 | 13 | 22 | |
| 2 | 9 | 14 | 21 | 25 |
| 3 | 8 | 15 | 20 | |
| 4 | 7 | 16 | 19 | 26 |
| 5 | 6 | 17 | 18 | |

Descramble Unit 92

Descramble Processing Circuit 132

*Fig.16*

| | LEFT | | | RIGHT |
|---|---|---|---|---|
| TOP | $S_{0,0}$ | $S_{0,1}$ | $S_{0,2}$ | $S_{0,3}$ | $S_{0,4}$ |
| | $S_{1,0}$ | $S_{1,1}$ | $S_{1,2}$ | $S_{1,3}$ | $S_{1,4}$ |
| | $S_{2,0}$ | $S_{2,1}$ | $S_{2,2}$ | $S_{2,3}$ | $S_{2,4}$ |
| | $S_{3,0}$ | $S_{3,1}$ | $S_{3,2}$ | $S_{3,3}$ | $S_{3,4}$ |
| | $S_{4,0}$ | $S_{4,1}$ | $S_{4,2}$ | $S_{4,3}$ | $S_{4,4}$ |
| | $S_{5,0}$ | $S_{5,1}$ | $S_{5,2}$ | $S_{5,3}$ | $S_{5,4}$ |
| | $S_{6,0}$ | $S_{6,1}$ | $S_{6,2}$ | $S_{6,3}$ | $S_{6,4}$ |
| | $S_{7,0}$ | $S_{7,1}$ | $S_{7,2}$ | $S_{7,3}$ | $S_{7,4}$ |
| | $S_{8,0}$ | $S_{8,1}$ | $S_{8,2}$ | $S_{8,3}$ | $S_{8,4}$ |
| BOTTOM | $S_{9,0}$ | $S_{9,1}$ | $S_{9,2}$ | $S_{9,3}$ | $S_{9,4}$ |

Encoding Circuit 204

Sync Block Data Generating Circuit 205

Data Length Direction

350 SYNC Block Data

Recording Deshuffling Circuit 206

SYNC Block (Fundamental Video Block)

SCRAMBLE SYSTEM FOR USE IN DIGITAL VIDEO SIGNAL RECORDING AND REPRODUCING SYSTEM OR TRANSMISSION AND RECEIVING SYSTEM, COMPRISING SCRAMBLE APPARATUS AND DESCRAMBLE APPARATUS

BACKGROUND OF THE INVENTION

1. Field of the Invention

The present invention relates to a scramble system for use in either a recording and reproducing system such as a digital video recorder or the like, or a transmission and receiving system for use through communication line such as an optical, coaxial or wireless communication line, in particular, to a scramble system comprising a scramble apparatus for scrambling a digital video signal and a descramble apparatus for descrambling the scrambled digital video signal, wherein, in further particular, the scrambled digital video signal is transmitted through an optical, wire or wireless communication line, or the scrambled digital video signal is recorded into a recording medium such as a magnetic tape, a magnetic disk, a magneto-optical disk, a compact disk or the like.

2. Description of the Related Art

A conventional scramble and descramble system including a scramble apparatus and a descramble apparatus is disclosed in, Lebrat, "Method and Device for Scrambling-unscrambling Digital Image Data", U.S. Pat. No. 5,208,857, as issued on May 4, 1993 (referred to as a first reference document 1 hereinafter). The conventional scramble and descramble system is used in a digital video recording or transmission system, in which a video signal is compressed according to the DCT (Discrete Cosine Transform) compression method in the unit of a DCT block composed of a plurality of pixels, and then the compressed video signal is recorded onto a magnetic recording medium such as a magnetic tape or disk or is transmitted through a communication line.

In the conventional scramble and descramble apparatus, a video signal prior to the compression process is subjected to a scramble process by replacing DCT blocks thereof, while the compressed and decompressed video signal is subjected to a descramble process by inversely replacing the DCT blocks thereof. When performing the scramble process, the video signal located in each DCT block does not change, and therefore, the video image can be scrambled without any influence on the compression efficiency.

Further, there has been proposed a digital video recording and reproducing system as disclosed in C. Yamamitsu et al., "A Study on Trick Plays for Digital VCR", IEEE Transactions on Consumer Electronics, Vol. 37, No. 3, August 1991 (referred to as a second reference document hereinafter). The conventional digital video recording and reproducing system performs not only a process for interpolating an error in reproducing a recorded image signal but also a high speed playback process in reproducing the recorded video signal.

When the above-mentioned former conventional scramble and descramble system is applied to the above-mentioned latter conventional digital video recording system for executing he interpolation process and the high speed playback process, the following problems occurs.

Each of the interpolation process and the high speed playback process in the digital video recording and reproducing system is performed in the unit of SYNC block composed of a plurality of DCT blocks, wherein the SYNC block will be described later in detail in the detailed description of the preferred embodiments. The above-mentioned interpolation process includes replacing a SYNC block having an error with the SYNC block located in the same position of the previous frame, while the above-mentioned high speed playback process includes producing a video signal of one frame by collecting the SYNC blocks from a plurality of frames without changing the position of the SYNC blocks in each frame.

As described above, the above-mentioned interpolation and high speed playback processes are provided for processing a video signal composed of a plurality of frames, and each thereof is a process for producing a further video signal by moving the SYNC block between frames or thinning out SYNC blocks, without changing the position of the SYNC blocks in each frame. In other words, each of the above-mentioned interpolation and high speed playback processes includes a process for producing a further video signal using the SYNC blocks of the original video signal.

In the specification, this kind type of process is referred to as "an image reconstruction process" using the SYNC blocks. The same process as described above can or may be executed using the fundamental video blocks other than the SYNC blocks. This type of process is referred to as an image reconstruction process using the fundamental video blocks.

When the image reconstruction process using the SYNC blocks such as the interpolation process, the high speed playback process or the like is executed in a stage between the scramble process and the descramble process of the conventional scramble system, a problem occurs as follows.

In a video signal that has been subjected to the image reconstruction process using the SYNC blocks after changing the positions of DCT blocks thereof in a scramble process, there exists a mixture frame composed of a plurality of SYNC blocks of the scrambled video signal. Subsequently, the DCT blocks are restored to the original positions through reverse replacement of the replacement process executed in the scramble process. However, in regard to the mixture frame, one frame of a plurality of original frames is to be descrambled. Therefore, the SYNC blocks brought from the other frames cannot always be restored to the original position. When the image reconstruction process using the SYNC blocks is executed in a stage between the scramble process and the descramble process, it is not always achieved to correctly execute the descramble process.

For instance, in the case of the interpolation process, one SYNC block of the current frame is replaced by the SYNC block of the previous frame. In the SYNC block, the DCT block prior to the interpolation process and the DCT block after the interpolation process are not always placed in the same position prior to the scramble process in a frame. In the descramble process, the processing is executed so that a DCT block of a SYNC block prior to the interpolation process is restored to the original position. Therefore, the DCT block in the SYNC block after the interpolation process is not always restored to the correct position.

As described above, the conventional scramble system has such a problem that the descramble process cannot always be executed correctly when the system is employed in the digital video recording and reproducing system for executing the interpolation process and/or the high speed playback process.

Further, for example, when the scramble process is effected on a video signal before the signal is transmitted into a digital video recording and reproducing system for executing a compression process according to a adaptive quantizing method in the conventional scramble system, the compression efficiency changes so as to result in such a problem than the resulting reproduction image possibly deteriorates as compared with the original image.

SUMMARY OF THE INVENTION

Accordingly, the present invention is intended to solve the aforementioned problem of the conventional scramble system, and an essential object of the present invention is to provide a scramble system including a scramble apparatus and a descramble apparatus, capable of correctly executing a scramble process and not allowing the original video signal to be obtained from the scrambled video signal, even though the above-mentioned image reconstruction process using the fundamental video blocks in which a video signal is to be performed, such as the interpolation process, the high speed playback process or the like is executed after performing the scramble process.

Another object of the present invention is to provide a scramble apparatus for executing a scramble process prior to a compression process and a descramble apparatus for descrambling the scrambled video signal, in the case where they are used in a digital communication system with performing the compression process using the adaptive quantizing method, said scramble and descramle apparatuses being capable of performing the scramble and descramble processes without any deterioration of reproduced video signal and obtaining sufficiently higher security.

According to the first aspect of the present invention, there is provided a scramble system for use in a recording and reproducing system or a transmission and receiving system wherein a frame of a digital video signal composed of a plurality of frames is divided into a plurality of predetermined fundamental video blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said fundamental video blocks from an inputted digital video signal composed of a plurality of frames without changing the positions of said fundamental video blocks in each of the frames, said scramble system comprising:

scramble means for executing a scramble process on said inputted digital video signal in the identical processing manner using said fundamental video blocks in the identical position in each of the frames and generating a scrambled video signal; and descramble means for effecting reverse conversion of said scramble process executed by said scramble means using said fundamental video blocks on said scrambled video signal generated by said scramble means.

The above-mentioned scramble system of the first aspect of the present invention executes a scramble process in the identical processing manner using the fundamental video blocks in the same position within each frame. In the scramble system, both of the fundamental video blocks of the video signal prior to the above-defined reconstruction process and the fundamental video blocks thereof after the reconstruction process are scrambled in the same processing manner. In this case, the fundamental video blocks of the video signal after the reconstruction process can be correctly descrambled, thereby achieving the above-mentioned first object of the present invention.

The above-mentioned scramble process is preferably performed by means of a block encryption such as a DES (Data Encryption Standard), which has been already known to those in the art and will be described in detail later, thereby obtaining a higher security. The reason for the above is that the limitation of scrambling the fundamental video blocks in the same processing manner is provided in the first aspect of the present invention, and therefore, there is a possibility of analyzing the method of restoring the scramble, i.e., the descrambling method corresponding to the scrambling method of the scrambled video signal based on the above-mentioned limitation.

However, the block encryption was made to encrypt a lot of data in the same processing manner, and therefore it is an encryption capable of assuring sufficiently higher security. Therefore, by means of the block encryption, the higher security can be assured not only in the case where the fundamental video blocks are encrypted in the same processing manner but also in the case where all the fundamental video blocks are encrypted in the same processing manner. The above-mentioned arrangement can produce such an advantageous effect that it is not necessary in the reconstruction process to limit the positions of the fundamental video blocks within each frame, thereby freely changing the same position thereof, in addition to such an advantageous effect that controlling and the compositions of the system can be realized more easily.

It is further preferred to scramble at least a DC (Direct-Current) component of a video signal. In this case, there is such an advantageous effect that an arbitrary block encryption can be used while keeping sufficiently higher security because of the followings. In order not to produce a portion which cannot be encrypted in executing a complete process using the fundamental video blocks by means of the block encryption, the data length of a block in the block encryption is required to be determined so that the data length can completely divide the data length of the portion that is to be encrypted within one fundamental video block, it is sometimes impossible to use the existing block encryption such as the DES or the like. However, by surely scrambling the DC component, the portion which is not processed possibly takes place only in an AC (Alternating-Current) component. The above-mentioned fact results in a difficulty in inferring or obtaining the original image from the scrambled image, thereby allowing an arbitrary block encryption to be used while keeping sufficiently higher security.

According to the second aspect of the present invention, there is provided a scramble system for use in a recording and reproducing system or a transmission and receiving system wherein a frame of a digital video signal composed of a plurality of frames is divided into a plurality of fundamental macro blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said macro blocks from an inputted digital video signal composed of a plurality of frames without changing the positions of said macro blocks in each of the frames, said scramble system comprising scramble means and descramble means, said scramble means comprising at least one of a block replacing unit and an inverting unit, said descramble means comprising at least one of a block inverse replacing unit and an inverting unit, wherein said block replacing unit replaces positions of said macro blocks of each frame of said inputted digital video signal based on an inputted control signal;

wherein said inverting unit executes inversion in level of all pixel signals of said inputted digital video signal based on said control signal; and wherein said block inverse replacing unit replaces the positions of said macro blocks of each frame of said inputted digital video signal based on said control signal in a reverse manner to that of said block replacing unit.

In other words, there is executed at least one of a replacement process for replacing the positions of the macro blocks in each frame according to instructions of a control signal, and an inverting process for inverting the macro blocks which is designated by the control signal. In this case, in regard to frames in the identical scene, the scramble process is executed through the identical replacement process and the identical inversion process. With the above-mentioned arrangement, each of the macro blocks can be restored to the correct position in each frame and the inversion of each data unit can be correctly restored in the identical scene even when a video image reconstruction process using the macro blocks is executed after the scramble process.

The above-mentioned scene is defined as a set of frames each frame having correlation coefficients larger than a predetermined threshold value, with adjacent frame in a video signal composed of a plurality of frames. In the specification, a scene change is defined as a change from a scene to another different scene, i.e., this means switching of scene. The features of the scene change are that the correlation coefficient between a frame and adjacent frame thereof at a timing when the scene change is smaller than that at the other timing when the scene change does not take place.

For example, a producer for producing a video tape of software can know the switching timing between a scene and another scene in editing the video tape, i.e., a scene change without calculating the correlation coefficients. Therefore, if the above-mentioned producer records a signal indicating the scene change onto the editing video tape together with a video signal, it is not necessary to provide the apparatus for detecting the scene change.

Furthermore, when the macro block is composed of a block to be processed in the compression process, the signal within each SYNC block data is not changed by the replacement process. This results in exerting no influence on the compression efficiency. Further, the inverting process inverts bits of all the pixel signals in the SYNC block data. Therefore, the correlation between pixel signals does not change in stages prior to and after the scramble process. This results in not changing the compression efficiency. With the above-mentioned arrangement, the reproduction image is not deteriorated in the apparatus according to the second aspect of the present invention.

According to the third aspect of the present invention, there is provided a scramble system for use in a recording and reproducing system or a transmission and receiving system wherein a frame of a digital video signal composed of a plurality of frames is divided into a plurality of predetermined macro blocks, either one of said recording and reproducing system and a transmission and receiving system executing a compression process in a unit of said macro block so that a video segment composed of a plurality of macro blocks has a fixed length after said compression process, said scramble system comprising:

scramble means for executing a scramble process by replacing the positions of said macro blocks of said inputted video signal and generating a scramble video signal; and descramble means for effecting reverse conversion of said scramble process executed by said scramble means on said scrambled video signal.

In the scramble apparatus of the third aspect of the present invention, a scramble process is executed by replacing video segments which are the units to be subjected to the compression process for compressing inputted data into data having a fixed length based on a random number. With the above-mentioned arrangement, since each video segment, i.e., the pixel signals to be compressed into data having he fixed length are not changed at all, the identical or same compression process can be executed prior to or after the scramble process. Therefore, there occurs no deterioration in the reproduced image due to influence of the scramble process. Furthermore, each video segment obtained prior to the compression process and each video segment obtained after the compression process have fixed lengths different from each other, wherein one video segment for which the previous compression process is performed with the reference of a reference video segment corresponds to another video segment for which the next compression process will be performed with reference of the above-mentioned reference video segment. Therefore, the same scramble signal can be obtained by performing the scramble process in the unit of the macro block even though the positions to be scrambled are the same as each other prior to the compression process or after the compression process. On the other hand, the same descramble signal can be obtained by performing the descramble process in the unit of the macro block even though the positions to be descrambled are the same as each other prior to the decompression process or after the decompression process.

BRIEF DESCRIPTION OF THE DRAWINGS

These and other objects and features of the present invention will become apparent from the following description taken in conjunction with the preferred embodiment thereof with reference to the accompanying drawings, in which:

FIG. 1 is a schematic block diagram of a digital video recorder including a scramble system according to a first preferred embodiment of the present invention;

FIG. 7A is a schematic explanatory view of the locations of the macro blocks Ai and Ci among the macro blocks shown in FIG. 6;

FIG. 7B is a schematic explanatory view of the locations of the macro blocks Bi and Di among the macro blocks shown in FIG. 6;

FIG. 7C is a schematic explanatory view of the locations of the macro blocks Ei among the macro blocks shown in FIG. 6;

FIG. 16 is a schematic diagram showing an arrangement of super blocks in the case of the NTSC system of the preferred embodiments;

DETAILED DESCRIPTION OF THE PREFERRED EMBODIMENTS

Figures 2A, 2B:
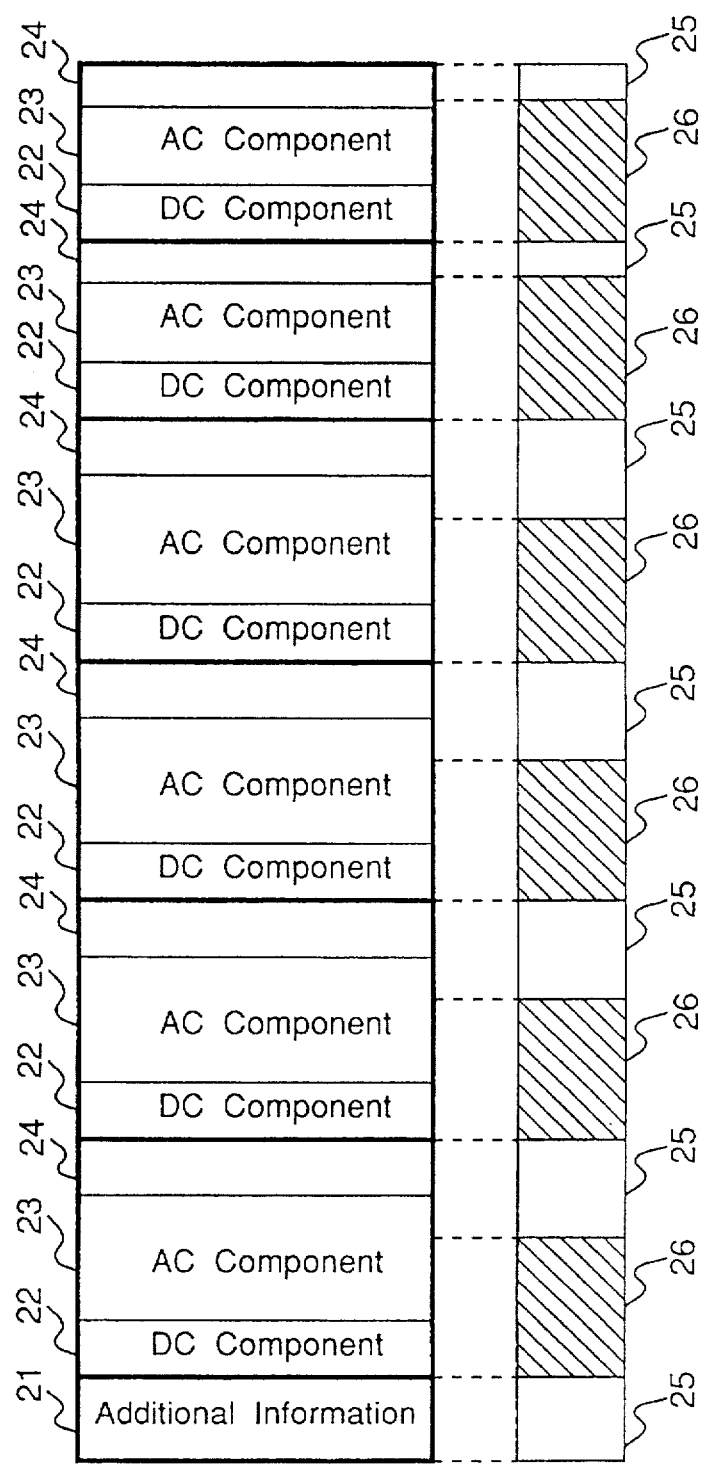
FIG. 2 is a schematic explanatory view of a SYNC block data generated by a compression unit 11 and the locations to be subjected to encryption in a scramble unit 12.

The preferred embodiments according to the present invention will be described detail with reference to the attached drawings.

THE FIRST PREFERRED EMBODIMENT

FIG. 1 shows a digital video recorder including a scramble system according to a first preferred embodiment of the present invention.

Referring to FIG. 1, the digital video recorder of the first preferred embodiment of the present invention comprises a scramble unit 12 and a descramble unit 16 in addition to a conventional digital video recording and reproducing system 18 which is disclosed in, for example, the above-mentioned second reference document. The digital video recording and reproducing system 18 comprises a compression unit 11, a recording unit 13, a recording medium 14, a reproducing unit 15, and a decompression unit 17.

In the preferred embodiment, the recording medium 14 is a magnetic tape, however, the present invention is not limited to this. The recording medium 14 may be a magnetic disk, a magneto-optical disk, a compact disk wherein information to be recorded is included in pits made in the compact disk, or the like.

The compression unit 11 executes a compression process in a manner as disclosed in the reference document 2, wherein the compression process includes the following processes:

(a) a DCT (Discrete Cosine Transform) process for executing data conversion in a unit of a macro block;

(b) an adaptive quantizing for assigning bits to the transformed data after the DCT process so that a video segment composed of a predetermined number of macro blocks has a predetermined fixed length; and (c) a process for reducing the data amount using a variable-length encoding method.

Figure 8:
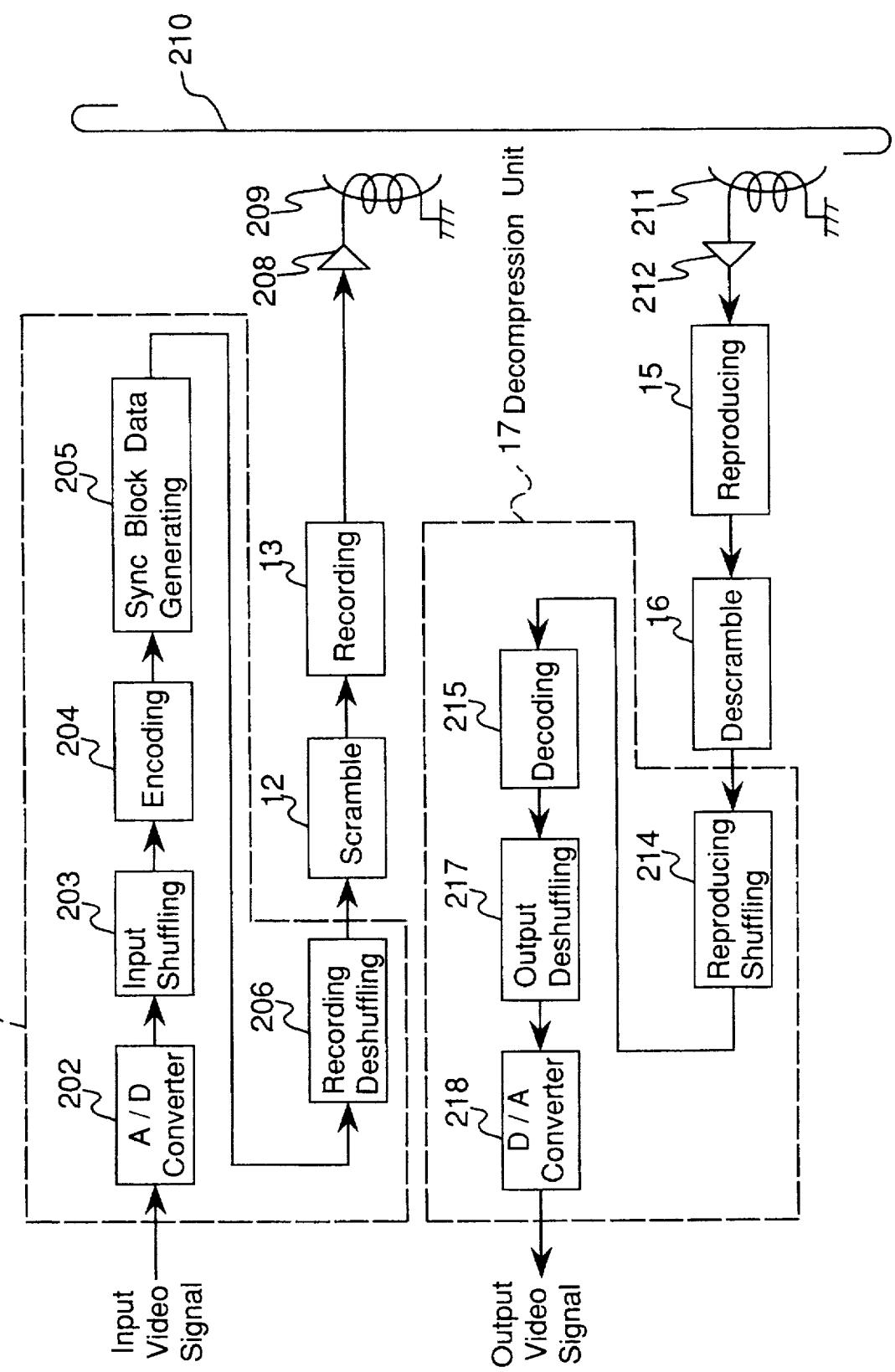
FIG. 8 is a detailed schematic block diagram of the digital video recorder shown in FIG. 1.

FIG. 8 shows the detailed concrete composition of the digital video recorder shown in FIG. 1.

Referring to FIG. 8, the compression unit 11 comprises an analog to digital converter (referred to as an A/D converter hereinafter) 202, an input shuffling circuit 203, an encoding circuit 204, a synchronous block data generating circuit (referred to as a SYNC block data generating circuit hereinafter) 205, and a recording deshuffling circuit 206. On the other hand, the decompression unit 17 comprises a reproducing shuffling circuit 214, a decoding circuit 215, an output deshuffling circuit 217, and a digital to analog converter (referred to as a D/A converter hereinafter) 218.

In the preferred embodiments, the description is made for the system of the preferred embodiments which are applied to an NTSC standard video signal having 525 scanning lines per frame and a field frequency of 60 Hz, and the present invention is not limited to this. The scramble system of the preferred embodiment may be applied to the PAL standard video signal having 625 scanning lines per frame and a field frequency of 50 Hz in a manner similar to that in the case for the NTSC standard video signal.

As shown in FIG. 1, an analog video signal inputted to the compression unit 11 is, first of all, inputted through the A/D converter 202 to the input shuffling circuit 203, which receives the inputted video signal of a 4:1:1 form component signal type standard television signal composed of a plurality of frames. In this case, each frame is composed of the followings:

(a) a Y frame representing a luminance;

(b) a B-Y frame; and (c) a R-Y frame.

Each of the B-Y frame and the R-Y frame represents a chrominance. The Y frame is composed of two fields, wherein each field is composed of 240 scanning lines and each scanning line is composed of 720 pixels. Further, each of the B-Y frame and the R-Y frame is composed of two fields, wherein each field is composed of 240 scanning lines and each scanning line is composed of 180 pixels. The input shuffling circuit 203 processes such an inputted video signal by dividing the video signal of one frame into DCT blocks and further collecting six DCT blocks, thereby forming a macro block. The construction of the macro block is described in detail as follows.

Figure 5:
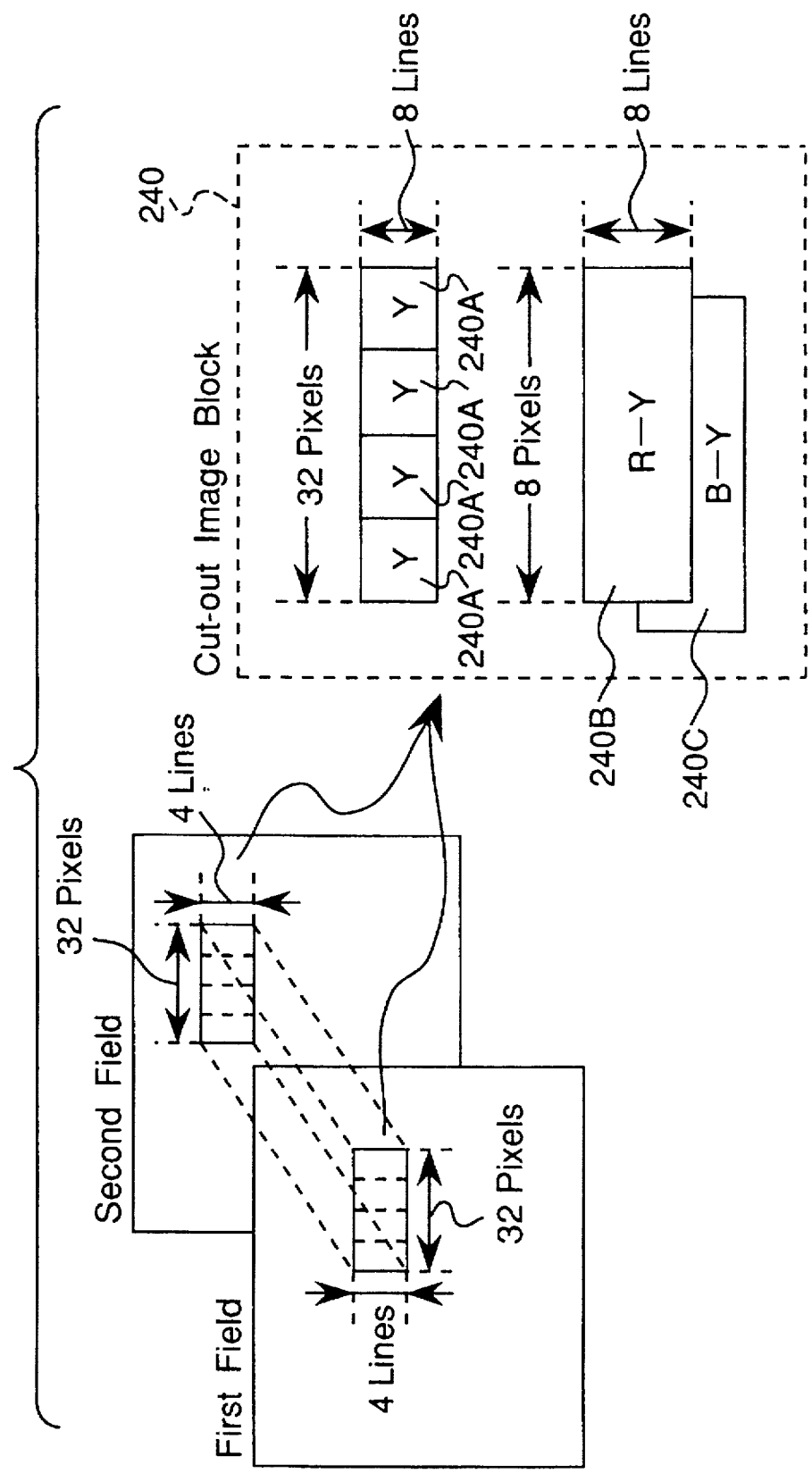
FIG. 5 is a schematic explanatory view of cut-out macro block from the first and second fields of an image of a video signal.

FIG. 5 shows the construction of a macro block of the standard television signal. As shown in FIG. 5, each macro block 240 cut-out from the first and second fields is composed of six DCT blocks including the followings:

(a) four Y signal blocks 240A, each composed of 8 [pixel/scanning line]×4 [scanning line/field]×2 [field];

(b) one R-Y signal block 240B; and (c) one B-Y signal block 240C.

In this case, the Y signal block, the R-Y signal block and the B-Y signal block exist in the Y frame, the R-Y frame and the B-Y frame, respectively. The R-Y signal block, the B-Y signal block and the four Y signal blocks within the same macro block are signals obtained by encoding the same area of the same frame.

Figure 6:
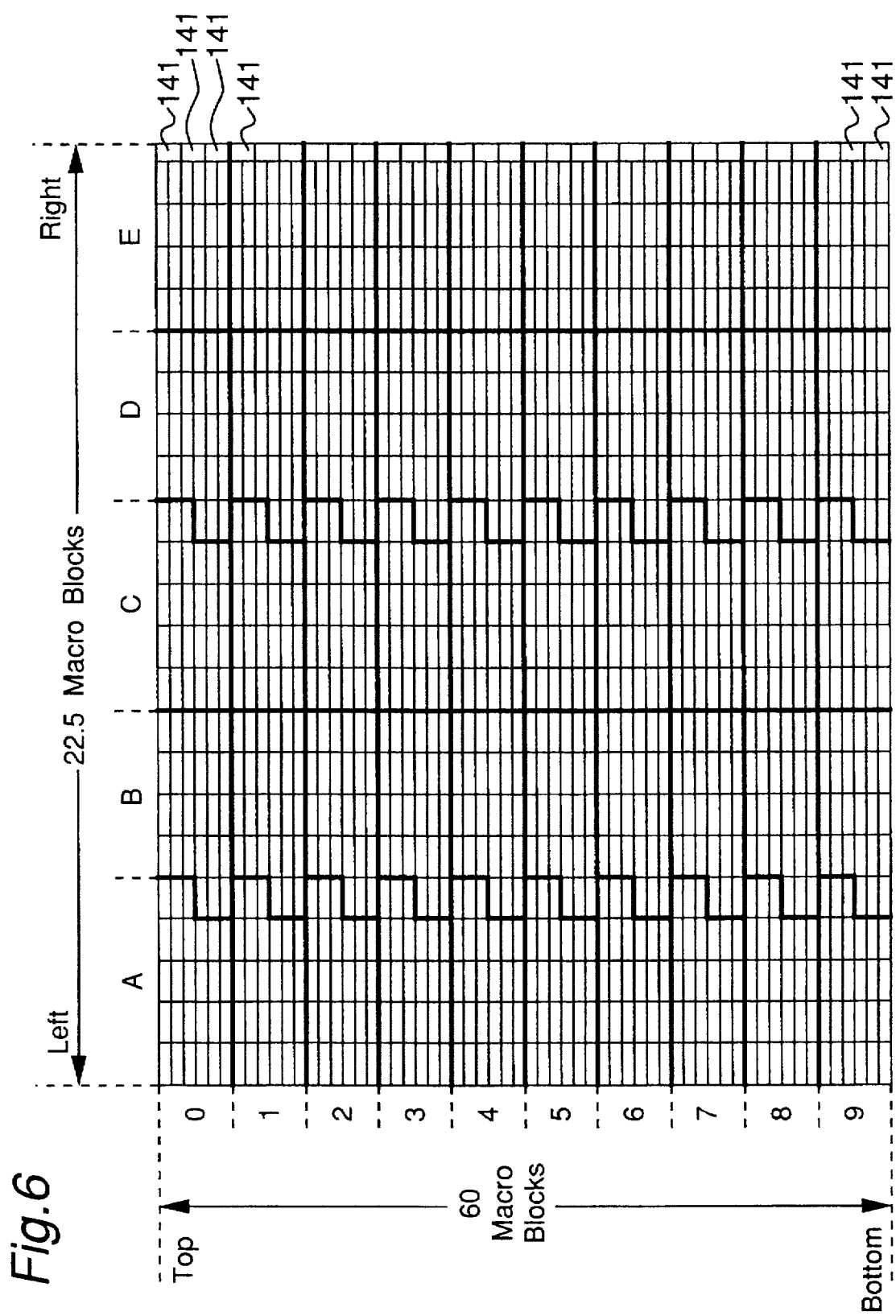
FIG. 6 is a schematic front view showing an arrangement of a plurality of macro blocks divided from a video signal of one frame.

FIG. 6 shows a macro block of the standard television signal of one frame.

Referring to FIG. 6, each minimum rectangle corresponds to a macro block. In FIG. 6, each portion which is segmented by thick lines and is composed of a plurality of divided macro blocks is represented by Xi. In this case, X represents a horizontal position which can be replaced by A to E, while i represents the vertical position which can be replaced by 0 to 9. As shown in FIG. 6, the standard television signal of one frame is composed of 50 Xi's, and Xi is composed of 27 macro blocks.

The whole macro block shown in FIG. 6 is composed of 22.5 micro blocks in the right and left direction and 60 micro blocks in the top and bottom direction. In a macro blocks 141 located in the right end portion of the video image, the luminance signal Y is composed of the data of the product of the horizontal data of 16 pixels by the vertical data of 8 lines per one field and thus the number of data is (16×8×2) per two fields (one frame). Moreover, the chrominance signals (R-Y) and (B-Y) are composed of the data of the product of the horizontal data of 4 pixels by the vertical data of 8 lines per field and thus the number of data is (4×8×2) per two fields (one frame).

FIGS. 7A through 7C show macro blocks in each Xi, wherein FIG. 7A shows the macro blocks Ai and Ci, FIG. 7B shows the macro blocks Bi and Di, and FIG. 7C shows the macro blocks Ei.

As shown in FIGS. 7A through 7C, numbers are given to the macro blocks of each Xi. When each macro block is expressed by Xi,j, the X and i are defined in a manner similar to that as described above in the case of Xi, while j represents the position of each macro block in each Xi and can be replaced by 0 to 26.

After the macro blocks are constructed in the above-mentioned manner, the input shuffling unit 203 collects five divided macro blocks, and then outputs a video segment $V_{i,j}$. In this case, the video segment $V_{i,j}$ is constructed by collecting five macro blocks in a manner as follows:

$$V_{i,j} = \{ C_{(i+2) \bmod 10, j},$$
$$B_{(i+6) \bmod 10, j},$$
$$D_{(i+8) \bmod 10, j},$$
$$A_{i,j},$$
$$E_{(i+4) \bmod 10, j} \}$$

wherein i=0, 1, 2, . . . , 9;

j=0, 1, 2, . . . 26; and

"n mod 10" represents a remainder obtained when dividing n by 10.

In other words, the video data of one frame of the standard television signal is divided into 270 video segments.

FIG. 6 can be rewritten to FIG. 16, which shows an arrangement of the super blocks corresponding to the above-mentioned macro blocks Xi. An address of each super block is represented by "$S_{i,j}$ (i=0, 1, . . . , 9; j=0, 1, . . . , 4)". One super block $S_{i,j}$ comprises 27 macro blocks. Horizontally neighboring two super blocks $S_{i,0}$ and $S_{i,1}$ are step-shaped at their boundaries in order to equalize the number of macro blocks in each super block. In a similar manner, horizontally neighboring two super blocks $S_{i,2}$ and $Si_{i,3}$ are step-shaped at their boundary.

In the super blocks of these three patterns, the macro block at the upper left-hand corner of each super block is given a first number and is represented by "0". Subsequently, the macro blocks arranged in the vertical direction with respect to the first macro block are given a series of number in the vertically arranged order. The next number of the final macro block in the vertical direction is given to the macro block neighboring to the final macro block in the horizontal direction. Subsequently, a series of number is given to the macro blocks arranged upward in the vertical direction in the arranged order.

Referring back to FIG. 8, the encoding circuit 204 receives the above-mentioned video segment $V_{i,j}$, and then converts the data of DCT blocks in each macro block of each video segment into frequency components of the data thereof using the DCT method, thereby obtaining and outputting converted video data. Then the converted data of each video segment is compressed using the variable-length encoding method, so as to generate a compressed data. In this case, the adaptive quantizing process for varying assignment of bits to each frequency component in the data conversion process is executed so as to make each compressed video segment to have a fixed length. In this case, each compressed video segment is divided into five SYNC block data corresponding to each macro block, wherein each SYNC block data includes a DC component and a AC component of the corresponding macro block as well as a AC component of other macro blocks of the same video segment.

As is apparent from (a) of FIG. 2 showing the construction of the SYNC block data, all the SYNC block data have the same data length and construction, wherein each SYNC block data is composed of additional information 21, a DC component 22, a AC component 23, and a AC component 24 of other macro blocks. Finally, the SYNC block data having the above-mentioned construction are outputted from the encoding circuit 204.

In the preferred embodiment, the DC component 22 corresponds to a direct-current among the frequency components obtained after the conversion by a DCT circuit 291, and corresponds to the average value of the video signals of all the pixels among the DCT blocks. On the other hand, the AC component 23 corresponds to an alternating-current among the frequency components after the conversion by the DCT circuit 291, and is composed of the components corresponding to a plurality of frequencies except for the DC component. Further, in each of the SYNC block data, data lengths and the position within the SYNC block data of each of the additional information 21 and the DC component 22 are the same as each other, respectively.

Figure 17:
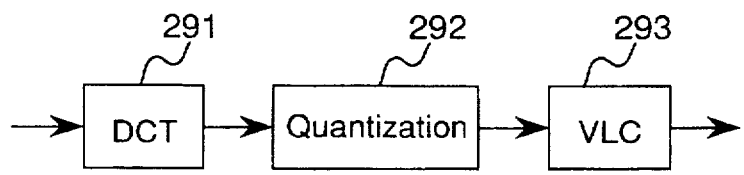
FIG. 17 is a schematic block diagram of an encoding circuit 204 shown in FIG. 8.

FIG. 17 shows the detailed composition of the encoding circuit 204 shown in FIG. 8. Referring to FIG. 17, the encoding circuit 204 comprises the DCT circuit 291, a quantization circuit 292 and a VLC circuit 293 (variable length coding circuit). The block data of a macro block inputted to the encoding circuit 204 is discrete-cosine transformed by the DCT circuit 291 in a manner which is well known to those skilled in the art. Subsequently, estimation of a data amount of encoded data is performed by the quantization circuit 292, so that the encoded data of each video segment is shorter than a predetermined data length, and the encoded data is quantized with reference to the estimated amount. The quantized data is inputted to the VLC circuit 293, and is encoded such manner that the code length of each video segment is shorter than the predetermined data length. The code data is outputted to the SYNC block data generating circuit 205.

Figure 19:
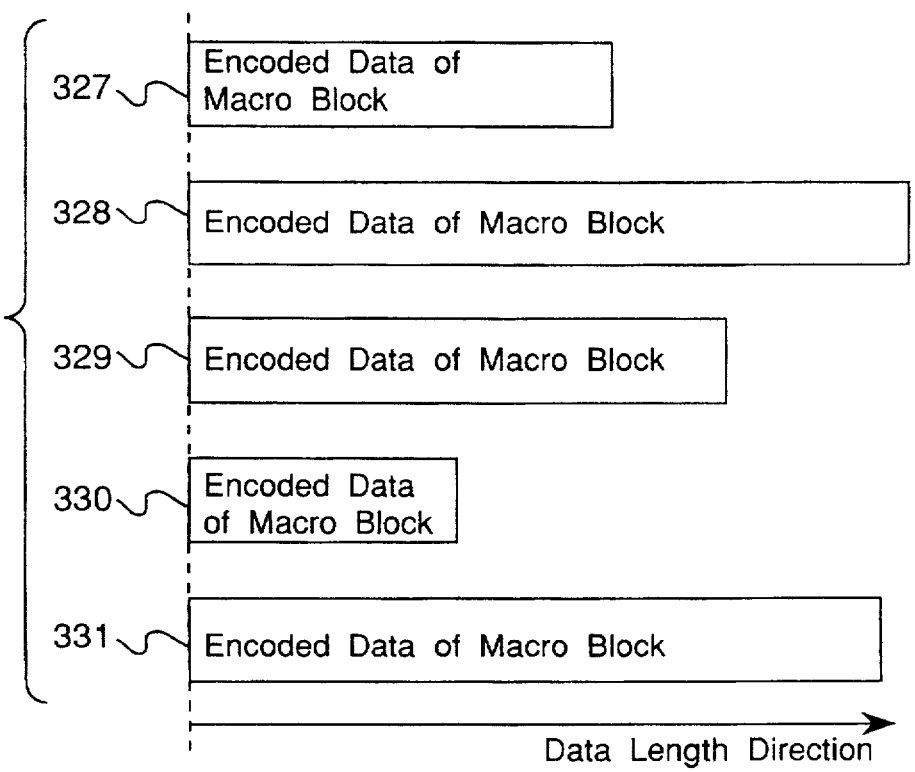
FIG. 19 is a schematic diagram showing encoded data of macro blocks obtained from one video segment in the preferred embodiments.

The encoded data of one video segment are shown in FIG. 19. The encoded data 327, 328, 329, 330 and 331 of each of five macro blocks are different from each other in the data length corresponding to the respective video images. However, the total of the encoded data of five macro blocks is limited to the predetermined data length.

Figure 18:
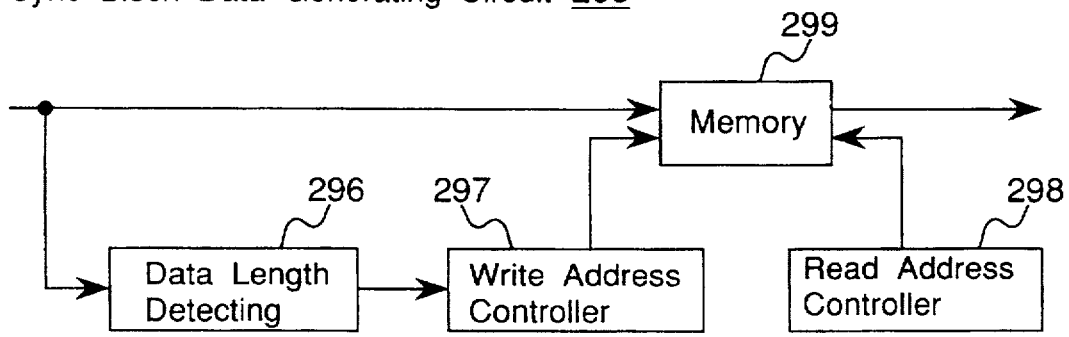
FIG. 18 is a schematic block diagram of a synchronous block data generation circuit 205 shown in FIG. 8.

FIG. 18 shows the detailed composition of the SYNC block data generating circuit 205. Referring to FIG. 18, the SYNC block data generation circuit 205 comprises a data length detecting circuit 296, a write address controller 297, a memory 299 and a read address controller 298.

Figure 20:
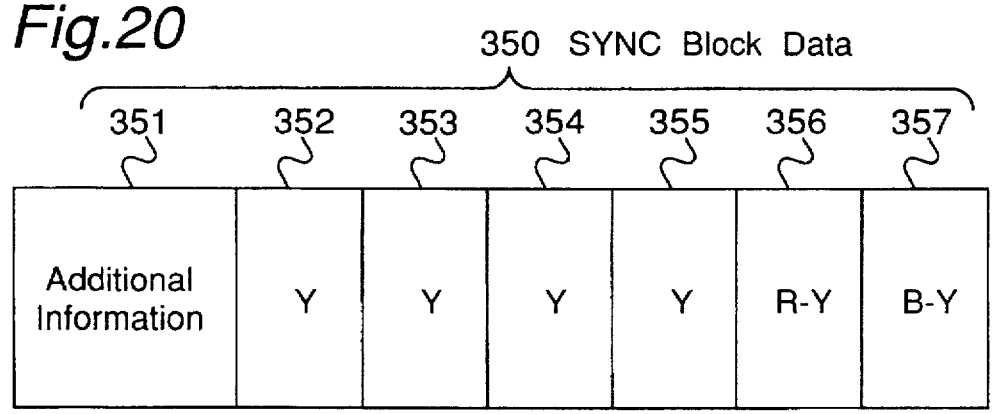
FIG. 20 is a schematic diagram showing a block data used in the preferred embodiments.

FIG. 20 is a diagram representing configuration of the SYNC block data.

Referring to FIG. 20, the SYNC block data 350 comprises the encoded data of the followings:

(a) an additional information 351;

(b) image data 352, 353, 354 and 355 of the luminance signal; and (c) image data 356 and 357 of the chrominance signals R-Y and B-Y.

The additional information data 351 represents condition of data compression. The data length of the image data 352 to 357 are set to a predetermined length, and a memory space corresponding to the predetermined data length is prepared in the memory 299 of the SYNC block data generating circuit 205 shown in FIG. 18.

In the SYNC block data generating circuit 205, the data lengths of the inputted image data 352 to 357 are detected by the data length detecting circuit 296. Subsequently, the image data 352 to 357 are written in the memory 299 on the basis of the output signal of the write address controller 297. In the write operation into the memory 299, the encoded data of the five macro blocks are incorporated in respective data areas of the five SYNC block data 350.

The five SYNC block data 350 are generated by the following process. The encoded data of the DCT block of one luminance signal is incorporated in the data area of the video data 352 in a manner that the DC components of the luminance signal are incorporated with priority. In a similar manner, the encoded data of the DCT blocks of luminance signals of three macro blocks are incorporated in the respective data areas of the video data 353, 354 and 355 such that the DC components of the respective luminance signals are incorporated with priority. In a similar manner, the encoded data of the DCT blocks of the chrominance signals R-Y and B-Y are incorporated in the data areas of the video data 356 and 357 with priority on the DC components.

In the memory areas prepared for the image data 352 to 357 in the memory 299, a memory area is filled with the encoded data and a part of the encoded data overflows. On the other hand, a memory area has a margin. In the case that encoded data overflow in the memory area of an image data, the overflowed encoded data are written in the memory area of video data having the margin in the memory areas of the same SYNC block data. The DC component of the signal is called a "main component". In the case that the encoded data overflow in spite of the above-mentioned operation, the overflowed part of the encoded data is written in the memory areas of the video data having a margin in other four SYNC block data.

Compression information is written in the memory area of the additional information 351. In this manner, the main component of the encoded data of one macro block is stored in the data area of one SYNC block data. Consequently, one SYNC block data 350 corresponds to one macro block data. The SYNC block data 350 stored in the memory 299 by the above-mentioned operation is read out under the control of the read address controller 298, and is applied to the recording deshuffling circuit 206.

Figure 21:
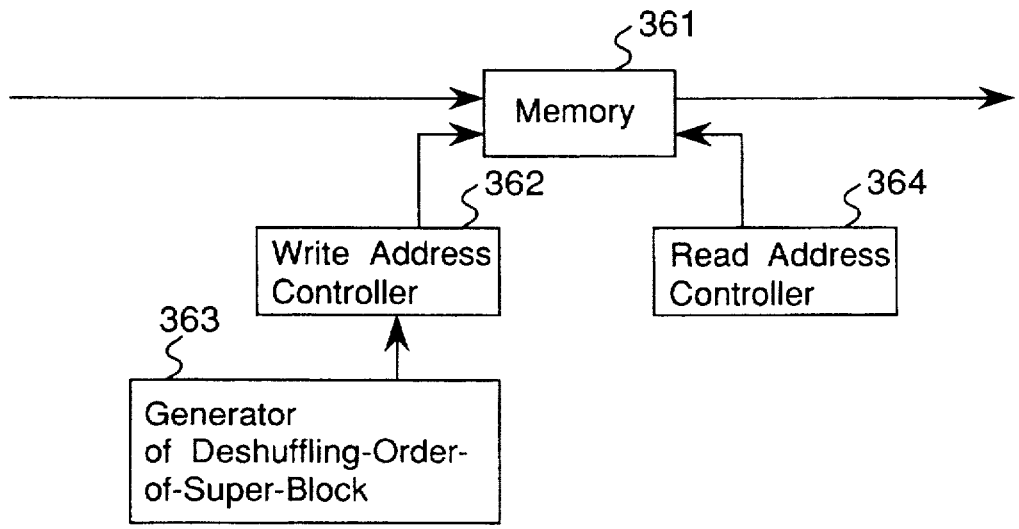
FIG. 21 is a schematic block diagram of a recording deshuffling circuit 206 shown in FIG. 8.

FIG. 21 shows the detailed composition of the recording deshuffling circuit 206 shown in FIG. 8.

Referring to FIG. 21, the recording deshuffling circuit 206 comprises a memory 361, a write address control circuit 362, a generator of deshuffling-order-of-super-block 363 and a read address controller 364.

The above-mentioned SYNC block data 350 outputted from the SYNC block data generating circuit 205 is written into the memory 361 based on a control signal outputted from the write address controller 362. The addresses of the memory 361 corresponding to the SYNC block data are set by the generator of deshuffling-order-of-super-block 363, and the SYNC block data are written into the memory 361 in compliance with the respective addresses.

The SYNC block data 350 stored in the memory 361 are successively read out by control of the read address controller 364, and are outputted through the scramble unit 12 of the present invention to the recording unit 13, as shown in FIG. 8.

Figure 22:
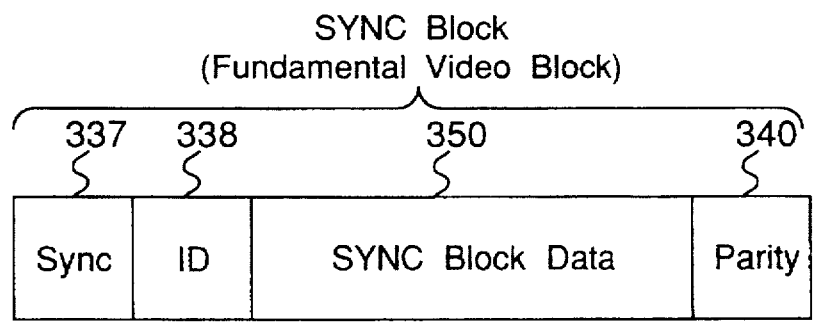
FIG. 22 is a schematic diagram showing a SYNC block used in the preferred embodiments.

In the recording unit 13, a predetermined error correction (parity) code 340, identification (ID) information 338 and a predetermined SYNC pattern 337 are added to each SYNC block data 350, as shown in FIG. 22, then forming the SYNC block.

Referring back to FIG. 8, a recording signal including the SYNC block is applied through a recording amplifier 208 into a recording magnetic head 209, so that the recording signal is recorded onto a magnetic tape 210.

That is, the recording unit 13 executes a recording process in a manner as described above, wherein the recording unit 13 generates a SYNC block by adding the data into the SYNC block data having a construction as shown in (a) of FIG. 2 and generating the recording signal including the SYNC block. As shown in FIG. 1, the recording unit 13 further outputs the recording signal into the recording medium 14 such as the magnetic tape 210 shown in FIG. 8. In this case, one SYNC block data corresponds to one SYNC block.

On the other hand, as shown in FIG. 8, in a reproducing process, the recording signal recorded on the magnetic tape 210 is detected by a reproducing magnetic head 211, and then is inputted through a reproducing amplifier 212, the reproducing unit 15, and the descramble unit 16 of the present invention to the decompression unit 17. That is, the reproducing unit 15 executes a reproducing operation together with an interpolation process and a high speed playback process which are described in, for example, the above-mentioned second reference document. The reproducing unit 15 reproduces the SYNC block from the recording signal by the reproducing magnetic head, and then generates a SYNC block data from the SYNC block and outputs the SYNC block data. In the preferred embodiment, the reproducing unit 15 executes the interpolation process for replacing a SYNC block having an error with the SYNC block of the previous frame in a manner as described hereinbefore. The reproducing unit 15 further executes the high speed playback process for generating a reproduction frame from the SYNC blocks of a plurality of frames according to designation of high speed playback control signal. Finally, the decompression unit 17 executes a decompression process. The decompression unit 17 practically executes a decompression process for decompressing the SYNC block data which has been compressed by the compression unit 11 so as to generate an output video signal from the SYNC block data.

Hereinafter, the following describes in detail the operations of the scramble unit 12 and the descramble unit 16.

The scramble unit 12 and the descramble unit 16 execute data processing by means of a block encryption. The block encryption is exemplified in, for example, U.S. Pat. No. 3,958,081, which utilizes the DES (Data Encryption Standard). This encryption is to encode and decode data in 64-bit blocks. In the encryption stage, a normal statement block is scrambled based on a key, thereby consequently obtaining an encryption block in 64 bits. On the other hand, in the decoding or deciphering stage, the encryption block in 64 bits is descrambled through reverse conversion of the scramble process based on the same key which is used in the encoding stage, thereby consequently restoring the normal statement block in 64 bits. The scramble unit 12 and the descramble unit 16 of the first preferred embodiment execute their processes by means of the DES.

As describe above, the scramble unit 12 and the descramble unit 16 perform an encryption process and a decryption process, respectively, based on the same key data. In the first preferred embodiment, the same key data is stored in a key data storage unit 34 and a key data storage unit 44, respectively, wherein each of the storage units 34 and 44 can be the followings:

(a) a memory such as a RAM, a ROM, or the like;
(b) a memory provided in an IC card;
(c) a magnetic recording medium provided within a magnetic card;
(d) a magnetic tape; and
(e) a bar-code, in this case, it is necessary to provide a bar-code reader.

Further, the scramble unit 12 may previously record the same key data in a storage unit provided therein using the multiple recording method, and reads out the same key data and outputs it to the descramble unit 16.

Figure 3:
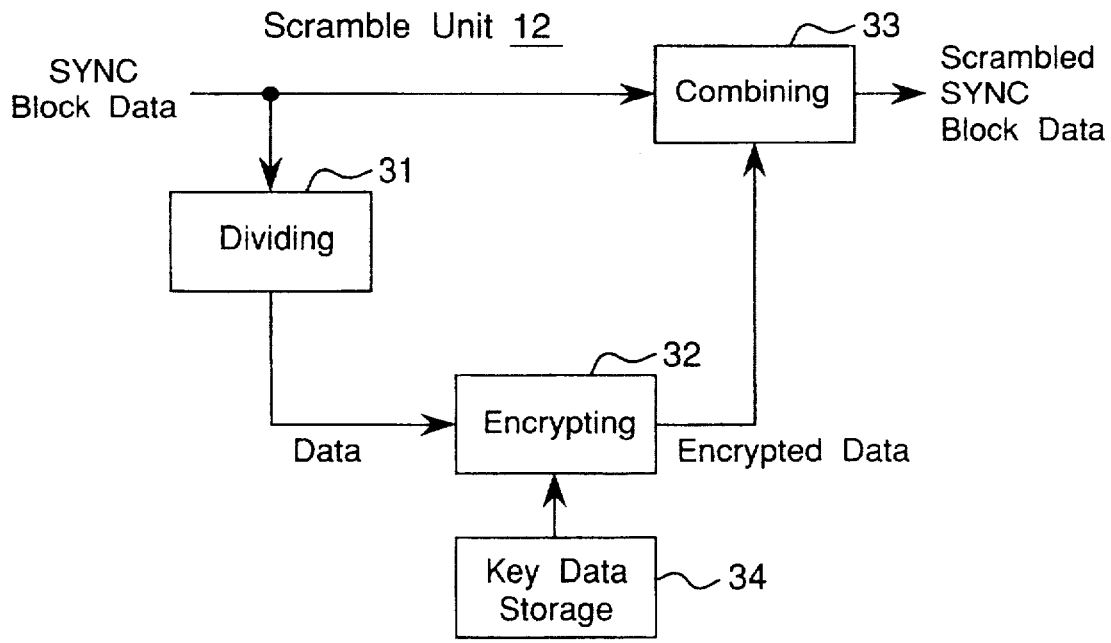
FIG. 3 is a schematic block diagram of the scramble unit 12 shown in FIG. 1.

For example, the scramble unit 12 reads out key data from the key data storage unit 34 provided therein as shown in FIG. 3, while the scramble unit 12 receives a SYNC block data obtained through the compression process in the compression unit 11, and then scramble the SYNC block data through block encryption in 64 bits based on designation of the key data. In this case, the encryption process is executed so that the encryption block does not span over a plurality of SYNC block data. Furthermore, the scramble unit 12 effects the same scramble process on all the SYNC block data based on the same key data.

FIG. 3 shows the detailed composition of the scramble unit 12 of the first preferred embodiment.

Referring to FIG. 3, the scramble unit 12 comprises a dividing unit 31, a block encrypting unit 32, and a combining unit 33 in addition to the above-mentioned key data storage unit 34. The following describes the operation of the scramble unit 12 of the first preferred embodiment of the present invention with reference to FIG. 3.

First of all, the dividing unit 31 takes out data of a position to be encrypted from an inputted SYNC block data as data to be encrypted. In this case, the data to be encrypted has a size of 64 bits. The dividing unit 31 takes out one or more pieces of data to be encrypted from the SYNC block data.

Thereafter, the block encrypting unit 32 reads out the key data from the key data storage unit 34, while the block encrypting unit 32 receives the data to be encrypted outputted from the dividing unit 31. Then the block encrypting unit 32 executes an encryption process using a predetermined block encryption method based on the above-inputted key data, thereby forming an output of encrypted data. Thereafter, the combining unit 33 receives not only the SYNC block data sent from the compression unit 11 but also the encrypted data outputted from the block encrypting unit 32, and combines them so as to form an output of encrypted SYNC block data, which is outputted to the recording unit 13. In this case, the combining unit 33 combines the encrypted data in the position from which the data to be encrypted is taken out of the SYNC block data by the dividing unit 31.

The following describes the operation of the scramble unit of the first preferred embodiment with respect to the attached drawings.

FIG. 2 is an explanatory view of a portion to be encrypted in an inputted data packet of the scramble unit 12 of the first preferred embodiment. In FIG. 2, (a) shows the construction of the SYNC block data as described hereinbefore, and (b) shows positions in regard to encryption, wherein the reference numeral 26 indicates the data part to be encrypted, and the reference numeral 25 indicates the data parc to be not encrypted. One data part 26 to be encrypted corresponds to 64 bits.

As shown in (b) of FIG. 2, one SYNC block data has six data parts 25 to be encrypted, and the portion including the six data parts 26 to be encrypted contains the entire DC component 22 and a part of the AC component 23. The dividing unit 31 of FIG. 3 outputs data in the part 25 of data to be encrypted from the input data inputted as the data to be encrypted.

Figure 4:
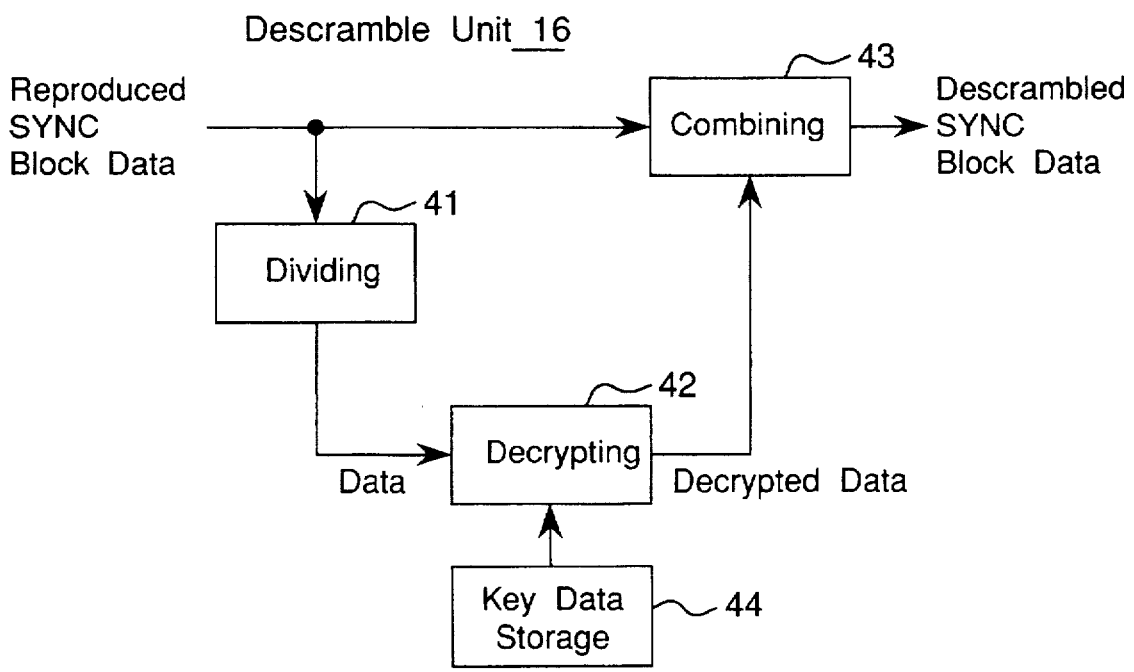
FIG. 4 is a schematic block diagram of a descramble unit 16 shown in FIG. 1.

On the other hand, the descramble unit 16 reads out the same key data as that of the scramble unit 12 from the key data storage unit 44 shown in FIG. 4, while the descramble unit 16 receives a SYNC block data reproduced by the reproducing unit 15, and descrambles the SYNC block data through 64-bit block encryption method based on the key data and then outputs the descrambled SYNC block data to the decompression unit 17. In this case, the descramble unit 16 descrambles the data located in the same position which has been selected to be the data to be encrypted by the scramble unit 12 with regard to all the SYNC block data in a manner of reversely converting the process executed by the scramble unit 12.

FIG. 4 shows the descramble unit 16 of the first preferred embodiment of the present invention.

Referring to FIG. 4, the descramble unit 16 comprises a dividing unit 41, a block decrypting unit 42 for executing a block decryption process, and a combining unit 43. In this case, the block decryption process is a decryption process to be effected on the data encrypted according to the block encryption. The following describes the operation of the descramble unit 16 of the first preferred embodiment in detail.

The dividing unit 41 and the combining unit 43 operate utterly in the same manner as that of the corresponding unit of the scramble unit 12. The block decrypting unit 42 reads out the key data from the key data storage unit 44, while the block decrypting unit 42 receives data to be encrypted outputted from the dividing unit 41, and decrypts the data to be encrypted based on the key data and then outputs the decrypted data. The block decrypting unit 42 executes the block decryption process which is reverse conversion of the process executed by the block encrypting unit 32 in the scramble unit 12 shown in FIG. 3, wherein the decryption process is executed in the identical processing manner by means of the identical key with regard to all the division data.

According to the first preferred embodiment as described above, all the SYNC blocks are scrambled and descrambled in the identical processing manner. Therefore, even when each of the interpolation process and the high speed playback process is executed in the reproducing unit 15, a correct restoration can be achieved. The reason for the above is as follows. Since the interpolation process and the high speed playback process include the processes of collecting SYNC blocks from a video signal composed of a plurality of frames and generating a further video signal, so long as all the SYNC blocks are scrambled and descrambled in the same processing manner, then all the SYNC blocks in the video signal obtained after the interpolation process and the high speed playback process can be correctly restored.

It is also possible that the method for restoring the scrambling is inferred by utilizing the limitation that all the SYNC block data are scrambled in the same processing manner. However, the present preferred embodiment does not have such disadvantage because it employs the block encryption that was made for the purpose of encrypting a lot of data in the same processing manner.

When a process to be completed in a SYNC block is executed by means of the DES, there is generated a part 26 which is not encrypted. However, since the encryption is always effected on the DC component, the part 26 which is not encrypted is only the AC component. When an image is reproduced from data having divided frequency components, the DC component is the part more influential on the character of the image. Since the DC component is entirely encrypted in the present preferred embodiment, even when the AC component can be restored, the reproduced scramble image is fairly disordered. Therefore, it is difficult to illegally infer the original image from the scramble image, which allows a scramble unit capable of obtaining sufficiently higher security to be achieved.

According to the first preferred embodiment of the present invention as described above, the scramble system capable of achieving correct restoration even when the interpolation process and the high speed playback process are executed and then assuring sufficiently higher security can be constructed.

Although the encryption and decryption processes are respectively executed through block encryption in 64-bit blocks by the scramble unit 12 and the descramble unit 16 of the first preferred embodiment of the present invention, the present invention is not limited to this. There may be used any other block encryption executed in blocks having an arbitrary size so long as the block is smaller than the SYNC block data. When a block greater than the 64-bit block is used, higher security can be assured. It is also acceptable to use any block encryption other than the DES. The encryption process may be executed by a method of replacing blocks through addition of random numbers or by means of random numbers.

Although all the SYNC block data are scrambled and descrambled by means of block encryption in the identical processing manner in the scramble unit 12 and the descramble unit 16 of the first preferred embodiment of the present invention, the present invention is not limited to this. There may be selected any other construction so long as the identical video image scramble process is effected on the SYNC block data in the identical position of each frame.

In the first preferred embodiment, the compression unit 11 generates a SYNC block data composed of the control data 21, the DC component 22, the AC component 23, and the AC component 24 of other SYNC block data as shown in (a) of FIG. 2, and the scramble unit 12 executes the encryption process by selecting either the part 26 of the data to be not encrypted or the part 25 of data to be encrypted as shown in (b) of FIG. 2. However, the present invention is not limited to this. When the compression unit 11 generates a SYNC block data composed of a DC component and an AC component, the scramble unit 12 is required to have a construction in which the part 25 of data to be encrypted is selected so that the entire DC component is encrypted. In this case, a video signal principally based on the DC component is generated, and therefore it is difficult to illegally infer the original image from the scrambled data. Then, the decompression unit 17 and the descramble unit 16 are required to have constructions corresponding to the compression unit 11 and the scramble unit 12, respectively.

In the first preferred embodiment of the present invention, the compression unit 11 generates a SYNC block data, in which the control data 21, the DC component 22, the AC component 23, and the AC component 24 of other SYNC block data are arranged as shown in (a) of FIG. 2, and then the scramble unit 12 executes the encryption process by selecting the part 26 of the data to be not encrypted and the part 25 of data to be encrypted as shown in (b) of FIG. 2. However, the present invention is not limited to this, and the components corresponding to a lower frequency among the DC component 22 and the AC component 23 may be selected with priority as the part 26 of the data to be encrypted. In this case, it becomes difficult to illegally infer the original image from the scrambled image. Furthermore, when data as many as possible are selected as the data part of the data to be encrypted, it becomes more difficult to illegally infer the original image from the scrambled image.

In the first preferred embodiment, the compression unit 11 generates a SYNC block data composed of the control data 21, the DC component 22, the AC component 23, and the AC component 24 of other SYNC block data as shown in (a) of FIG. 2, and the scramble unit 12 executes the encryption process by selecting either the part 26 of the data to be not encrypted or the part 25 of data to be encrypted as shown in (b) of FIG. 2. However, the present invention is not limited to this. When the compression unit 11 generates a SYNC block data composed of fixed-length data and variable-length encoded data, the scramble unit 12 is required to have a construction in which the part 25 of data to be encrypted is selected so that the entire fixed-length data and the top of the variable-length encode data are encrypted. In this case, when the variable-length encoded data includes at least one error bit, the error will be transmitted or recorded to stages subsequent to the code including the error until the error is refreshed in the worst case. Since the encrypted portion of the variable-length code is converted into a random value which does not conform to the specification of the variable-length code, the part thereof is treated like the error code. Therefore, so long as the top of the variable-length code is encrypted, even when a portion exists which is not encrypted, it is highly possible that the portion will be determined to be an error code. This results in producing an effect that is more effective than the effect obtained in the case where conversion into a random number is executed through an intentional encryption process, which allows a scramble unit having higher security to be constructed. In this case, the decompression unit 17 and the descramble unit 16 are required to have constructions corresponding to the compression unit 11 and the scramble unit 12, respectively.

The descramble unit 16 of the first preferred embodiment of the present invention executes the interpolation process and the high speed playback process. When either one of the processes is executed, or when an image reconstruction process is executed using the other fundamental video blocks, it is of course allowed to construct a scramble system capable of correctly restoring the video image after the image reconstruction process such as the interpolation process, the high speed playback process or the like.

Although the dividing unit 31 and the combining unit 33 are provided separately in the scramble unit of the first preferred embodiment, a delay unit is necessary for the dividing unit 31 and the combining unit 33 when the inputted data transmitted once in a timing is smaller than the size of the encryption block. In this case, by integrally implementing the dividing unit 12 and the combining unit 16 in a form of an integrated unit, the delay unit can be commonly used while allowing the same effect to be produced.

Although the scramble unit 12 and the descramble unit 16 of the first preferred embodiment have the constructions as shown in FIGS. 3 and 4, there may be selected any construction so long as the construction is such that the encoding and decoding processes are effected on all the SYNC block data in the same processing manner while preventing each SYNC block data from spanning over a plurality of SYNC block data.

The scramble unit 12 and the descramble unit 16 of the firs preferred embodiment are applied to a digital video recording and reproducing system as described hereinbefore and have constructions in which a SYNC block data is inputted and the encoding and decoding processes are effected on all the SYNC block data thereof in the same processing manner while preventing each SYNC block data from spanning over a plurality of SYNC block data. When the scramble and descramble units 12 and 16 are applied to an arbitrary system in which an interpolation process for replacing a data unit having an error with an adjacent data unit is executed in a stage between the scramble unit 12 and the descramble unit 16, there may be selected any construction so long as the construction is such that the encryption and decryption processes are effected on all the data units in the same processing manner while preventing each data unit from spanning over a plurality of data units. The above-mentioned arrangement allows a scramble system capable of achieving the interpolation process in the apparatus to which the units are applied to be constructed.

The scramble unit 12 and the descramble unit 16 of the first preferred embodiment are applied to a digital video recording and reproducing system as described hereinbefore and have constructions in which a SYNC block data is inputted and the encoding and decoding processes are effected on all the SYNC block data thereof in the same processing manner while preventing each SYNC block data from spanning over a plurality of SYNC block data. When the scramble and descramble units 12 and 16 are applied to an arbitrary system in which a high speed playback process for collecting data units from a plurality of frames so as to generate a reproduction frame is executed in a stage between the scramble unit 12 and the descramble unit 16, there may be selected any construction so long as the construction is such that the encryption and decryption processes are effected on all the data units in the same processing manner while preventing each data unit from spanning over a plurality of data units. The above-mentioned arrangement allows a scramble system capable of achieving the high speed playback process to be constructed.

The scramble unit 12 and the descramble unit 16 of the first preferred embodiment of the present invention are applied to a digital video recording and reproducing system as described hereinbefore and have constructions in which a SYNC block data is inputted and the encoding and decoding processes are effected on all the SYNC block data in the same processing manner while preventing each SYNC block data from spanning over a plurality of SYNC block data. When the scramble and descramble units 12 and 16 are applied to an arbitrary system in which a video image reconstruction process is executed using the fundamental video blocks, there may be selected any construction so long as the construction is such that the encryption and decryption processes are effected on all the data units in the same processing manner while preventing each data unit from spanning over a plurality of data units. The above-mentioned arrangement allows a scramble system capable of achieving the video image reconstruction process in the unit of data to be constructed.

In the first preferred embodiment, the encryption process and the decryption process are performed using the same one key data, however, the present invention is not limited to this. Every time a program of software or broadcasting is changed or a predetermined time interval has been elapsed, the key data may be changed. In this case, at the timing of the change of the key data, the high speed playback and the interpolation process can not be performed. However, in this case, there is an advantageous effect of obtaining higher security. Then, in is necessary to use the same key data, and the method for using the same key data is the same as that as described above.

THE SECOND PREFERRED EMBODIMENT

Figure 9:
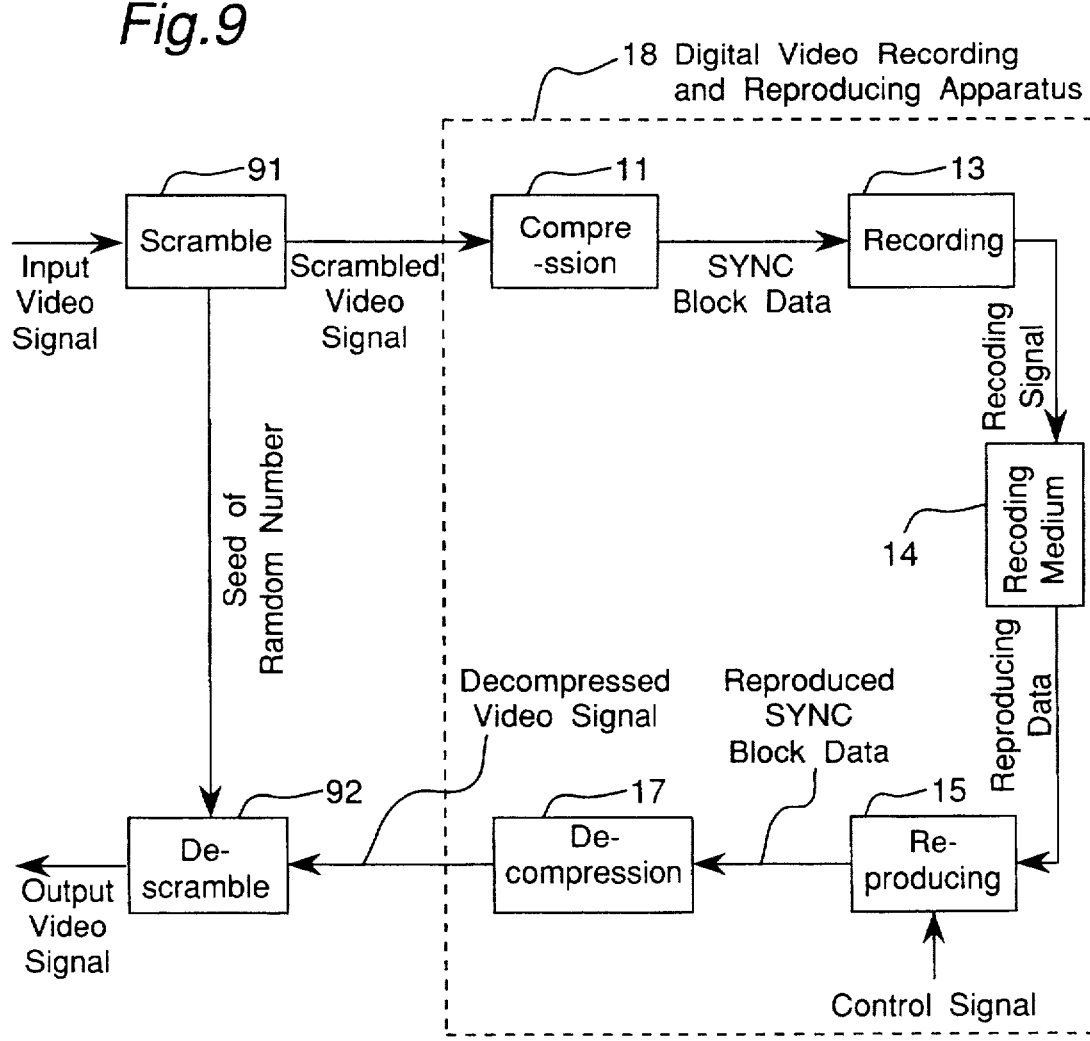
FIG. 9 is a schematic block diagram of a digital video recorder including a scramble system according to a second preferred embodiment of the present invention.

The following describes a second preferred embodiment of the present invention with reference to FIG. 9 showing a digital video recorder including a scramble system of the second preferred embodiment of the present invention.

Referring to FIG. 9, the digital video recorder comprises a scramble unit 91, a descramble unit 92 and the digital video recording and reproducing apparatus 18, wherein the digital video recording and reproducing apparatus 18 comprises the compression unit 11, the recording unit 13, the recording medium 14, the reproducing unit 15, and the decompression unit 17. In the digital video recorder of the first preferred embodiment shown in FIG, 9, the compression unit 11, recording unit 13, the recording medium 14, the reproducing unit 15, and the decompression unit 17 operate in manners similar to those of these denoted by the same numerals in the first preferred embodiment. A macro block and a video segment have the same constructions as those of the first preferred embodiment. In the present case, the compositions and the operations of the scramble unit 91 and the descramble unit 92 will be described in detail below.

Figure 10:
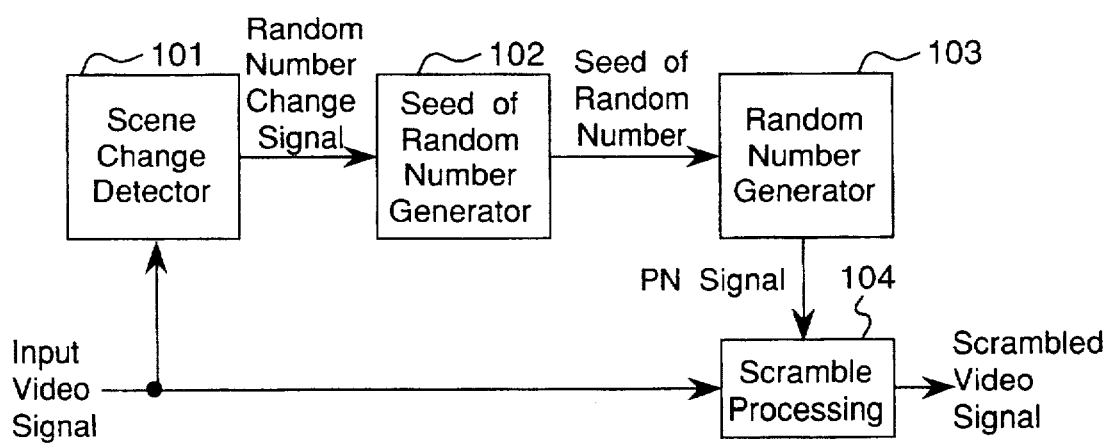
FIG. 10 is a schematic block diagram of a scramble unit 91 shown in FIG. 9.

FIG. 10 shows the scramble unit 91 shown in FIG. 9.

Referring to FIG. 10, the scramble unit 91 comprises a scene change detector 101, a seed of random number generator 102, a random number generator 103, and a scramble processing circuit 104. The following describes the operation of the scramble unit 91 of the present preferred embodiment in detail.

The scene change detector 101 detects such a timing when a scene change which has been defined above has been effected from a video signal composed of a plurality of frames, and generates a random number change signal in correspondence with the first frame after the scene change, i.e., the top frame of the scene. In this case, the scene change is detected in a manner of calculating a value of correlation between adjoining or adjacent two frames and, when the calculated correlation value exceeds a predetermined threshold value, the scene change detector 101 detects the timing between the adjacent frames as the scene change.

The seed of random number generator 102 generates a seed of random number in each frame. The seed is generated in a manner of, first of all, generating a seed of random number for the first frame. Thereafter, a new seed of random number is generated for the frame having a random number change signal. For the frame having no random number change signal, the same seed of random number as that for the previous frame is generated. The random number generator 103 generates a PN (pseudo noise) signal including a pseudo random pattern in each frame based on the seed of random number generated from the seed of random number generator 102 in a manner which is known to those skilled in the art. In the scramble processing circuit 104, the data of the inputted video signal is scrambled according to the designation of the PN signal generated from the random number generator 103.

The scramble processing circuit 104 receives the inputted video signal and the PN signal outputted from the random number generator 103, and effects the scramble process through the processes of replacement of macro blocks in each frame and inversion in the unit of the macro block.

Figures 11, 12A, 12B:
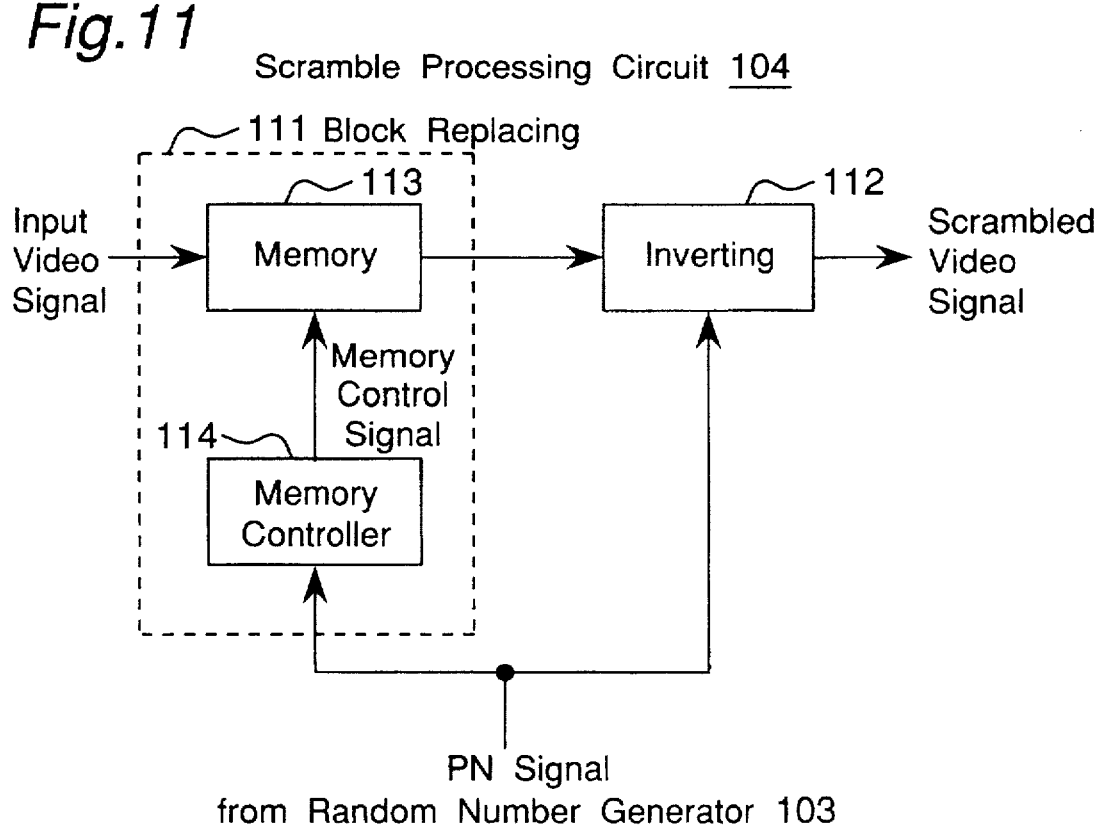
FIG. 11 is a schematic block diagram of a scramble processing circuit 104 shown in FIG. 10.
FIG. 12A is a table of an inverting process performed by an inverting circuit 112, showing a firs example of relationship between original data and inverted data in the case of the original data comprised of one-bit sign and two-bit integer.
FIG. 12B is a table of an inverting process performed by an inverting circuit 112, showing a second example of relationship between original data and inverted data in the case of the original data comprised of three-bit integer.

FIG. 11 shows the scramble processing circuit 104 shown in FIG. 10.

Referring to FIG. 11, the scramble processing circuit 104 comprises a block replacing unit 111, and an inverting unit 112, wherein the block replacing circuit 104 comprises a memory unit 113 and a memory controller 114. The following describes the operation of the scramble processing circuit 104 in detail.

First of all, the block replacing unit 111 receives the input video signal and the PN signal generated from the random number generator 103, and replaces the position of macro blocks of the input video signal of each frame under the control of the PN signal. The block replacing unit 111 is composed of the memory unit 113 and the memory controller 114, as describe above, wherein the memory unit 113 is provided for storing or recording video signals of two frames. In other words, the memory unit 113 is composed of two frame memories. The memory unit 13 alternately reads out and writes the video signal of each frame from and into the two frame memories thereof according to designation of a memory control signal.

The memory control signal is generated by the memory controller 114 in a manner as follows. In a write timing, a write address of the memory unit 113 is designated to the memory 113 so that the macro blocks are replaced in position according to designation of the PN signal. In the read timing, a read address is designated to the memory 113 so as to read the data written in each frame memory in an order in which the data are recorded.

At a timing, the frame memory of the memory 113 into which a video signal is written is different from the frame memory thereof from which another video signal is read, i.e., there are provided two frame memory system. After reading of a video signal of one frame is completed, the frame memory of the memory 113 from which a video signal is to be read out is changed from the frame memory which has completely read out the same at that timing to another frame memory. After writing of a signal of one frame is completed, the frame memory into which a signal is to be written is changed from the frame memory which has completely written therein at that timing to another frame memory. The memory controller 114 generates the memory control signal so that the memory unit 113 executes the above-mentioned operations.

Then the inverting unit 112 receives the inputted video signal composed of a plurality of macro blocks and the PN signal corresponding to each macro block which is sent from the random number generator 103, and then determines based on the designation of the PN signal whether or not an inversion will be executed or not. In this case, when the inversion is not executed by the inverting unit 112, the macro block inputted to the inverting unit 112 is outputted as it is as the scrambled video signal to the compression unit 11 of the digital video recording and reproducing apparatus 18. On the other hand, when the inversion is executed, the result data of inverting in level the values of all the pixel signals in the macro block about the middle value in the dynamic range, i.e., the video signal including the inverted data is outputted as the scrambled video signal.

FIGS. 12A and 12B show the inverting processes of the pixel signals in the inverting circuit 112.

FIG. 12A shows expression of three-bit signed integers in the twos complement form including one-bit sign data and two-bit video data, wherein inversion of pixel signals having the dynamic range of 100 to 011 is shown therein.

FIG. 12B shows expression of three-bit unsigned integers including three-bit video data and no sign data, wherein inversion of pixel signals having the dynamic range of 000 to 111 is shown therein.

As described above, the inverting process is to select the middle value between the maximum level and the minimum level of the pixel signals, using a reference value and invert each pixel level about the reference value.

Figure 13:
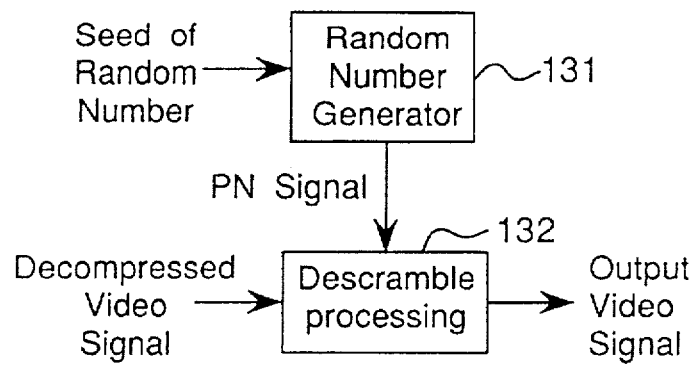
FIG. 13 is a schematic block diagram of a descramble unit 92 shown in FIG. 9.

FIG. 13 shows the construction of the descramble unit 92 of the second preferred embodiment shown in FIG. 9.

Referring to FIG. 13, the descramble unit 92 comprises a random number generator 131 and a descramble processing circuit 132. The following describes the operation of the descramble unit in detail.

As shown in FIG. 13, the descramble unit 92 receives an inputted video signal composed of a plurality of frames and a seed of random number corresponding to each frame outputted from the seed of random number generator 102 of the scramble unit 91 shown in FIG. 10. In this case, the seed of random number is the same seed of random number used in scrambling the video signal in the scramble unit 91, wherein the seed is separately sent and inputted from the seed of random number generator 102 into the random number generator 131 shown in FIG. 13.

First of all, the random number generator 131 generates a PN (pseudo noise) signal in each frame based on the inputted seed of random number. Then, the descramble processing circuit 132 descrambles the data of the inputted video signal according to designation of the PN signal generated from the random number generator 131.

The descramble processing circuit 132 executes reverse conversion of the process executed in the scramble processing circuit 104 of the scramble unit 91 shown in FIG. 10.

Figure 14:
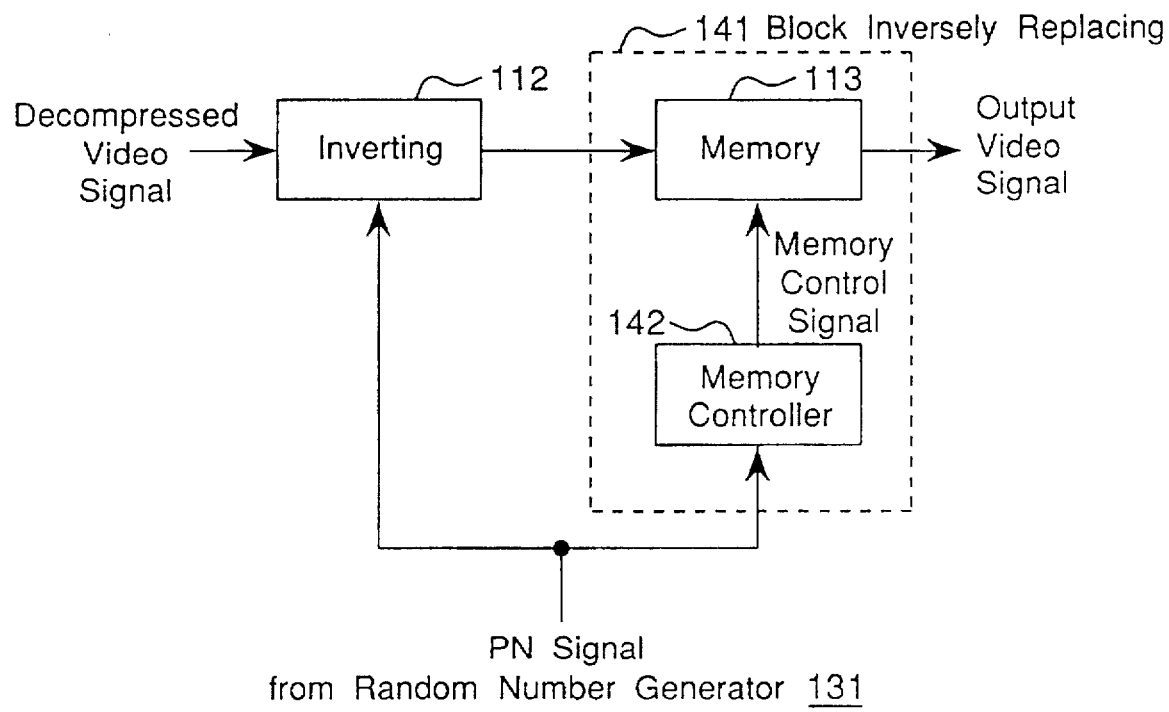
FIG. 14 is a schematic block diagram of a descramble processing circuit 132 shown in FIG. 13.
Figure 15:
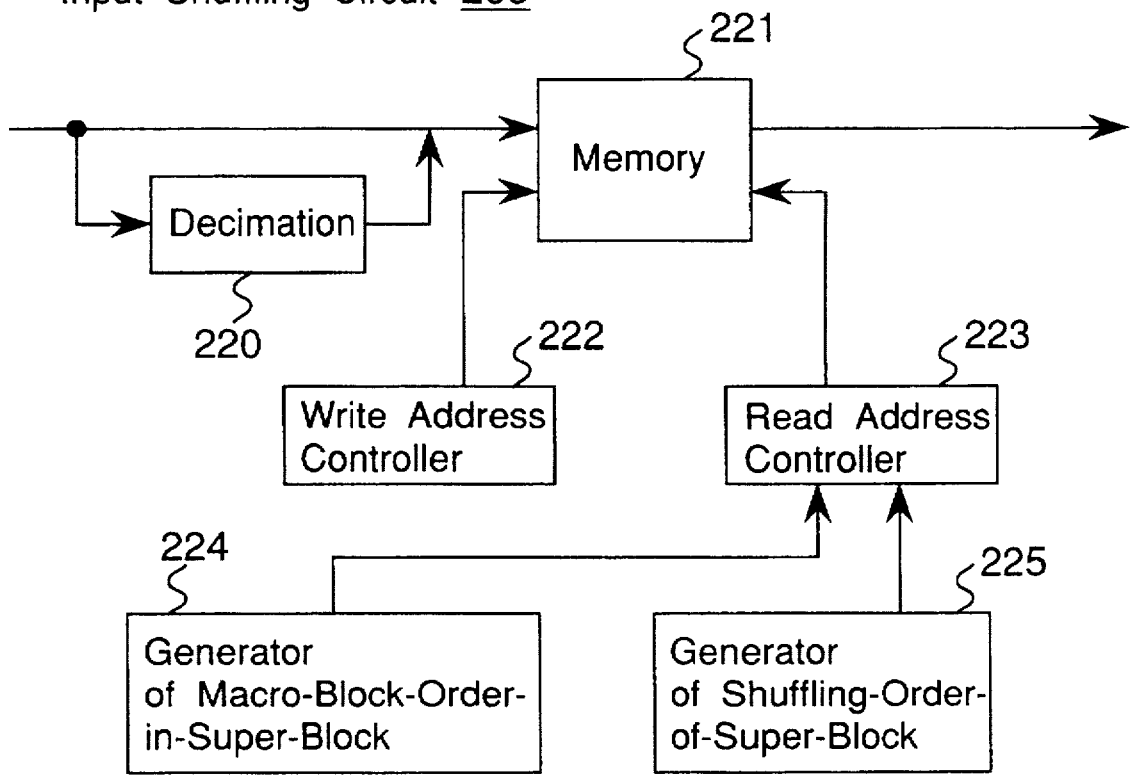
FIG. 15 is a schematic block diagram of an input shuffling circuit 203 shown in FIG. 8.

FIG. 14 shows the detailed composition of the descramble processing circuit 132 of the second preferred embodiment shown in FIG. 9.

Referring to FIG. 14, the descramble processing circuit 132 comprises an inverting unit 112, and a block inversely replacing unit 141, wherein the block inversely replacing unit 141 comprises a memory unit 113, and a memory controller 142. The following describes the operation of the descramble processing circuit 132 in detail.

In the descramble processing circuit 132, the operations of the inverting unit 112 and the memory unit 113 are the same as those of the units denoted by the same numerals in the scramble processing circuit 104, and therefore no description therefor is provided herein. The operation of the memory controller 142 is provided for exchanging the write address with the read address designated by the memory controller 114. In other words, the write address designated by the memory controller 114 is the read address designated by the memory controller 142, while the read address designated by the memory controller 114 is the write address designated by the memory controller 142.

According to the second preferred embodiment as described above, the operation of the descramble processing circuit 132 is the reverse conversion of the process executed by the scramble processing circuit 104, thereby allowing correct restoration to be achieved.

In all the frames in the period of the identical scene, the macro blocks are replaced and inverted in the same manners as each other. The interpolation process and the high speed playback process are provided for collecting SYNC blocks (synchronous blocks) from an inputted video signal composed of a plurality of frames without changing the positions of the SYNC blocks in each frame, thereby generating a new further video signal, wherein each SYNC block corresponds to each macro block. Therefore, each SYNC block of a video image obtained after the interpolation process and the high speed playback process is descrambled in the correct position or is correctly inverted to be decoded. Since the interpolation process and the high speed playback process are innately or originally the processes taking advantage of high correlation between frames, the processes loose their effects in the timing of scene change, wherein the correlation between frames is not the highest. Therefore, it is not necessary to take the processes into consideration in the scramble process.

Furthermore, according to the block inversely replacing unit 141 of the scramble processing circuit 104, the scramble process is achieved by replacing the position of data of each macro block while not changing the data in each macro block at all. Since each SYNC block data is composed of a plurality of DCT blocks, there is produced almost no deterioration attributed to the influence of the scramble process in the reproduction image in the same manner as in the conventional scramble system.

In regard to the macro block inverted in the inverting unit 112, all the pixel signals in the macro block are inverted, and therefore each value of difference between the pixel signals in the macro block where the inversion was executed is only inverted in polarity, namely, the polarity thereof is inverted. Therefore, the correlation between the pixel signals in the macro block prior to the scramble process does not change after the scramble process. The above-mentioned means that, when data conversion such as the DCT or the like is executed, no change occurs in the AC component of the converted data of the video signal. Therefore, when the video signal obtained after the scramble process is compressed, the compression efficiency does not reduce. Therefore, the reproduction image obtained by compressing the scrambled video signal, decompressing the compressed video signal, and then descrambling the scrambled video signal, namely, the resulting signal does not deteriorate as compared with the case where the scramble process is not executed.

In regard to the macro block designated by the random number in each frame, the scramble process is achieved by inverting all the pixel signals in the macro block. With the above-mentioned arrangement, there are mixedly existing the macro block in which the inversion is executed and the macro block in which the inversion is not executed in the identical frame, which results in a video image that is hardly appreciated as a whole so as to loose the value of appreciation thereof. Furthermore, it is difficult for the party who does not know the random number to analyze the video image, which leads to obtainment of sufficiently higher security.

According to the scramble system of the second preferred embodiment of the present invention as described above, there can be constructed a scramble system which can be applied to a system wherein a compression process, an interpolation process, and a high speed playback process are executed, the constructed scramble system causes no deterioration of the reproduction image, exhibits its high ability of matching with the interpolation process and high speed playback process, and assures sufficiently higher security.

When a scene change signal is provided for each frame of the video signal inputted to the scramble unit in the second preferred embodiment, the scene change detector is not necessary by using the scene change signal, thereby allowing the same effect to be obtained.

Although the position of each macro block is replaced in the block replacing unit 111 of the second preferred embodiment, by adopting a construction in which the position of each video segment is replaced, no influence is exerted on the bit assignment process according to the adaptive quantizing method, thereby allowing the scramble process to be achieved without exerting any influence on the compression operation.

Although each macro block is replaced in each frame in the block replacing unit 111 of the second preferred embodiment, by adopting a construction in which each macro block is replaced in each video segment, no influence is exerted on the bit assignment process according to the adaptive quantizing method, thereby allowing scramble to be achieved without exerting any influence on the compression operation.

Although each macro block is replaced in the block replacing unit 111 of the second preferred embodiment, the same effect can be obtained by adopting a construction in which each DCT block is replaced, when the degree of image scrambling further increases.

The scramble unit 91 of the second preferred embodiment executes its process in the unit of the macro block to be able to be applied to the conventional digital video recording and reproducing apparatus 18 in which the compression process as shown in FIG. 8 is executed. When the scramble unit 91 is applied to a digital communication system in which another compression process is executed, the same effect can be obtained with a construction in which replacement and inverting processes are executed in processing units obtained by combining one or more of the minimum data unit of the compression process executed in the digital communication system to which the scramble unit 91 is applied.

In the inverting unit 112 of the scramble unit 91 of the second preferred embodiment, there is shown the case where pixel signals of which values can be expressed in the full range of the dynamic range are scrambled. Even when the dynamic range of the pixel signals to be subject to the process is smaller than the dynamic range exemplified in the second preferred embodiment, by adopting a construction in which the pixel signals of the division block inputted to the inverting unit 112 are inverted about the middle value in the dynamic range, the scramble process can be achieved in the same manner to produce the same effect.

There is shown the case where pixel signals each expressed by three bits are scrambled in the inverting unit 112 of the scramble unit 91 of the second preferred embodiment, the same scramble process can be achieved through the same inverting process when pixel signals expressed by four bits are scrambled or when pixel signals expressed by an arbitrary number of bits are scrambled.

Although the scramble processing circuit 104 of the second preferred embodiment employs he inverting unit 112 and the block replacing unit 111, either one of the units may be eliminated when a simplified circuit construction is desired at the cost of reducing the degree of scramble. When the above-mentioned construction is adopted, the corresponding one unit 111 or 112 which has been in the scramble processing circuit 104 is not necessary in the descramble processing circuit 132.

It is noted than the inverting unit 112 and the block replacing unit 111 of the scramble processing circuit 104 of the second preferred embodiment may be arranged in reverse order. When the above-mentioned construction is adopted, it is required to achieve an arrangement in reverse order in the same manner as in the descramble processing circuit 132.

Although the scramble unit 91 of the second preferred embodiment is provided with the scene change detector 101, the scene change detector 101 may be eliminated when the interpolation process and the high speed playback process are not executed in the reproducing unit 15, and the seed of random number generator 102 may have a construction in which a varied or changed seed of random number is generated in an arbitrary frame. When the above-mentioned construction is adopted, a scramble system designed only for the matching with the compression process is achieved.

In the above-mentioned first and second preferred embodiments, the NTSC video signal is used as a video signal, however, the present invention is not limited to this. The other video signal such as the PAL video signal, the SECAM video signal or the like may be used in the present invention.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A scramble system for use in a recording and reproducing system or a transmission and receiving system wherein a frame of a digital video signal composed of a plurality of frames is divided into a plurality of predetermined macro blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said macro blocks from an inputted digital video signal composed of a plurality of frames without changing the positions of said macro blocks in each of the frames, said scramble system comprising scramble means and descramble means, said scramble means comprising at least one of a block replacing unit and an inverting unit, said descramble means comprising at least one of a block inverse replacing unit and an inverting unit, wherein said block replacing unit replaces positions of said macro blocks of each frame of said inputted digital video signal based on an inputted control signal;

wherein said inverting unit executes inversion in level of all pixel signals of said inputted digital video signal based on said control signal; and wherein said block inverse replacing unit replaces the positions of said macro blocks of each frame of said inputted digital video signal based on said control signal in a reverse manner to that of said block replacing unit.

2. The scramble system as claimed in claim 1, further comprising a control signal generating means for generating said control signal which is the same within a plurality of frames of the same scene of said inputted digital video signal, said scene being defined as a set of frames each frame having correlation coefficients larger than a predetermined threshold value, with adjacent frame in said inputted video signal.

3. The scramble system as claimed in claim 1, wherein said control signal is a pseudo noise signal including a pseudo random pattern generated based on a seed of a random number.

4. A scramble apparatus for use in a recording and reproducing system or a transmission and receiving system wherein a frame of a digital video signal composed of a plurality of frames is divided into a plurality of predetermined macro blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said macro blocks from an inputted digital video signal composed of a plurality of frames without changing the positions of said macro blocks in each of the frames, said scramble apparatus comprising at least one of a block replacing unit and an inverting unit, wherein said block replacing unit replaces positions of said macro blocks of each frame of said inputted digital video signal based on an inputted control signal; and wherein said inverting unit executes inversion in level of all pixel signals of said inputted digital video signal based on said control signal.

5. The scramble apparatus as claimed in claim 4, further comprising a control signal generating means for generating said control signal which is the same within a plurality of macro blocks of the same scene of said inputted digital video signal, said scene being defined as a set of frames each frame having correlation coefficients larger than a predetermined threshold value, with adjacent frame in said inputted video signal.

6. The scramble apparatus as claimed in claim 4, wherein said control signal is a pseudo noise signal including a pseudo random pattern generated based on a seed of a random number.

7. A descramble apparatus for use in a recording and reproducing system or a transmission and receiving system wherein a frame of a digital video signal composed of a plurality of frames is divided into a plurality of predetermined macro blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said macro blocks from an inputted digital video signal composed of a plurality of frames without changing the positions of said macro blocks in each of the frames, said descramble apparatus comprising at least one of a block inverse replacing unit and an inverting unit, wherein said block inverse replacing unit replaces the positions of said macro blocks of each frame of said inputted digital video signal based on an inputted control signal in a reverse manner to that of block replacing unit for replacing positions of said macro blocks of each frame of said inputted digital video signal; and wherein said inverting unit executes inversion in level of all pixel signals of said inputted digital video signal based on said control signal.

8. The descramble apparatus as claimed in claim 7, wherein said control signal is a pseudo noise signal including a pseudo random pattern generated based on a seed of a random number.

9. A scramble system for use in a recording and reproducing system or a transmission and receiving system wherein a frame of a digital video signal composed of a plurality of frames is divided into a plurality of predetermined macro blocks, either one of said recording and reproducing system and a transmission and receiving system executing a compression process in a unit of said macro block so that a video segment composed of a plurality of macro blocks has a fixed length after said compression process, said scramble system comprising:

scramble means for executing a scramble process by replacing the positions of said macro blocks of said inputted video signal prior to said compression process, and generating a scramble video signal; and descramble means for effecting reverse conversion of said scramble process executed by said scramble means on said scrambled video signal after a decompression process for effecting reverse conversion of said compression process.

10. A scramble system for use in a recording and reproducing system or a transmission and receiving system wherein a frame of a digital video signal composed of a plurality of frames is divided into a plurality of predetermined macro blocks, either one of said recording and reproducing system and a transmission and receiving system executing a compression process in a unit of said macro block so that a video segment composed of a plurality of macro blocks has a fixed length after said compression process, said scramble system comprising:

scramble means for executing a scramble process by replacing the positions of said macro blocks of said inputted video signal prior to said compression process, and generating a scramble video signal.

11. A descramble system for use in a recording and reproducing system or a transmission and receiving system wherein a frame of a digital video signal composed of a plurality of frames is divided into a plurality of macro blocks, either one of said recording and reproducing system and a transmission and receiving system executing a compression process in a unit of said macro block so that a video segment composed of a plurality of macro blocks has a fixed length after said compression process, said descramble system comprising:

descramble means for descrambling an inputted scrambled video by replacing the positions of said macro blocks of said inputted video signal after a decompression process for effecting reverse conversion of said compression process, and generating an original digital video signal.

12. A scramble system for use in a recording and reproducing system or a transmission and receiving system wherein a frame of a digital video signal composed of a plurality of frames is divided into a plurality of predetermined fundamental video blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said fundamental video blocks from an inputted digital video signal composed of a plurality of frames without changing the positions of said fundamental video blocks in each of the frames, said scramble system comprising:

scramble-means for executing a scramble process on respective fundamental video blocks in respective frames of said inputted digital video signal, and for generating a scrambled video signal, said scramble means executing the same scramble process as a scramble process executed on a first fundamental video block in a first frame, on a second fundamental video block in a second frame when the position of the second fundamental video block is equal to the position of the first fundamental video block in respective frames; and descramble means for effecting reverse conversion of said scramble process executed by said scramble means using said fundamental video blocks on said scrambled video signal generated by said scramble means, wherein said reconstruction process includes an interpolation process for replacing a first fundamental video block having an error with another second fundamental video block located in the same position as that of said first fundamental video block having the error, based on an inputted digital video signal.

13. A scramble system for use in a recording and reproducing system or a transmission and receiving system wherein a frame of a digital video signal composed of a plurality of frames is divided into a plurality of predetermined fundamental video blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said fundamental video blocks from an inputted digital video signal composed of a plurality of frames without changing the positions of said fundamental video blocks in each of the frames, said scramble system comprising:

scramble-means for executing a scramble process on respective fundamental video blocks in respective frames of said inputted digital video signal, and for generating a scrambled video signal, said scramble means executing the same scramble process as a scramble process executed on a first fundamental video block in a first frame, on a second fundamental video block in a second frame when the position of the second fundamental video block is equal to the position of the first fundamental video block in respective frames; and descramble means for effecting reverse conversion of said scramble process executed by said scramble means using said fundamental video blocks on said scrambled video signal generated by said scramble means, wherein said reconstruction process includes a high speed playback process for generating frames for high speed playback, using said fundamental video blocks, based on an inputted digital video signal.

14. A scramble system for use in a recording and reproducing system or a transmission and receiving system wherein a frame of a digital video signal composed of a plurality of frames is divided into a plurality of predetermined fundamental video blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said fundamental video blocks from an inputted digital video signal composed of a plurality of frames without changing the positions of said fundamental video blocks in each of the frames, said scramble system comprising:

scramble-means for executing a scramble process on respective fundamental video blocks in respective frames of said inputted digital video signal, and for generating a scrambled video signal, said scramble means executing the same scramble process as a scramble process executed on a first fundamental video block in a first frame, on a second fundamental video block in a second frame when the position of the second fundamental video block is equal to the position of the first fundamental video block in respective frames; and descramble means for effecting reverse conversion of said scramble process executed by said scramble means using said fundamental video blocks on said scrambled video signal generated by said scramble means, wherein said scramble means executes said scramble process by encrypting said inputted digital video signal using a block encryption method having an encryption block smaller than said fundamental video block, so as to prevent said encryption blocks from spanning over a plurality of fundamental video blocks, and wherein said descramble means executes said descramble process by reversely converting said scrambled video outputted from said scrambled means, using the same block encryption method as that of said scramble means.

15. The scramble system as claimed in claim 14, wherein said inputted digital video signal includes;
(a) a DC component representing an average value of said inputted digital video signal of all pixels; and
(b) an AC component including a plurality of frequencies except for said DC component, and wherein said scramble means encrypts at least said DC component of said inputted digital video signal using said fundamental video blocks.

16. A scramble apparatus for use in a recording and reproducing system or a transmission and receiving system wherein a frame of a digital video signal composed of a plurality of frames is divided into a plurality of predetermined fundamental video blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said fundamental video blocks from an inputted digital video signal composed of a plurality of frames without changing the positions of said fundamental video blocks in each of the frames, said scramble apparatus comprising:

scramble-means for executing a scramble process on respective fundamental video blocks in respective frames of said inputted digital video signal, and for generating a scrambled video signal, said scramble means executing the same scramble process as a scramble process executed on a first fundamental video block in a first frame, on a second fundamental video block in a second frame when the position of the second fundamental video block is equal to the position of the first fundamental video block in respective frames, wherein said reconstruction process includes an interpolation process for replacing a first fundamental video block having an error with another second fundamental video block located in the same position as that of said first fundamental video block having the error, based on an inputted digital video signal.

17. A scramble apparatus for use in a recording and reproducing system or a transmission and receiving system wherein a frame of a digital video signal composed of a plurality of frames is divided into a plurality of predetermined fundamental video blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said fundamental video blocks from an inputted digital video signal composed of a plurality of frames without changing the positions of said fundamental video blocks in each of the frames, said scramble apparatus comprising:

scramble-means for executing a scramble process on respective fundamental video blocks in respective frames of said inputted digital video signal, and for generating a scrambled video signal, said scramble means executing the same scramble process as a scramble process executed on a first fundamental video block in a first frame, on a second fundamental video block in a second frame when the position of the second fundamental video block is equal to the position of the first fundamental video block in respective frames, wherein said reconstruction process includes a high speed playback process for generating frames for high speed playback, using said fundamental video blocks, based on an inputted digital video signal.

18. A scramble apparatus for use in a recording and reproducing system or a transmission and receiving system wherein a frame of a digital video signal composed of a plurality of frames is divided into a plurality of predetermined fundamental video blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said fundamental video blocks from an inputted digital video signal composed of a plurality of frames without changing the positions of said fundamental video blocks in each of the frames, said scramble apparatus comprising:

scramble-means for executing a scramble process on respective fundamental video blocks in respective frames of said inputted digital video signal, and for generating a scrambled video signal, said scramble means executing the same scramble process as a scramble process executed on a first fundamental video block in a first frame, on a second fundamental video block in a second frame when the position of the second fundamental video block is equal to the position of the first fundamental video block in respective frames, wherein said scramble means executes said scramble process by encrypting said inputted digital video signal using a block encryption method having an encryption block smaller than said fundamental video block, so as to prevent said encryption blocks from spanning over a plurality of fundamental video blocks.

19. The scramble apparatus as claimed in claim 18, wherein said inputted digital video signal includes;
(a) a DC component representing an average value of said inputted digital video signal of all pixels; and
(b) an AC component including a plurality of frequencies except for said DC component, and
wherein said scramble means encrypts at least said DC component of said inputted digital video signal using said fundamental video blocks.

20. A descramble apparatus for use in a recording and reproducing system or a transmission and receiving system wherein a frame of a digital video signal composed of a plurality of frames is divided into a plurality of predetermined fundamental video blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said fundamental video blocks from an inputted digital video signal composed of a plurality of frames without changing the positions of said fundamental video blocks in each of the frames, said scramble system comprising:

descramble means for descrambling respective fundamental video blocks in respective frames of an inputted scrambled digital video signal, and for generating a descrambled video signal, said descramble means executing the same descramble process as a descramble process executed on a first fundamental video block in a first frame, on a second fundamental video block in a second frame when the position of the second fundamental video block is equal to the position of the first fundamental video block in respective frames, wherein said reconstruction process includes an interpolation process for replacing a first fundamental video block having an error with another second fundamental video block located in the same position as that of said first fundamental video block having the error, based on an inputted digital video signal.

21. A descramble apparatus for use in a recording and reproducing system or a transmission and receiving system wherein a frame of a digital video signal composed of a plurality of frames is divided into a plurality of predetermined fundamental video blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said fundamental video blocks from an inputted digital video signal composed of a plurality of frames without changing the positions of said fundamental video blocks in each of the frames, said scramble system comprising:

descramble means for descrambling respective fundamental video blocks in respective frames of an inputted scrambled digital video signal, and for generating a descrambled video signal, said descramble means executing the same descramble process as a descramble process executed on a first fundamental video block in a first frame, on a second fundamental video block in a second frame when the position of the second fundamental video block is equal to the position of the first fundamental video block in respective frames, wherein said reconstruction process includes a high speed playback process for generating frames for high speed playback, using said fundamental video blocks, based on an inputted digital video signal.

22. A descramble apparatus for use in a recording and reproducing system or a transmission and receiving system wherein a frame of a digital video signal composed of a plurality of frames is divided into a plurality of predetermined fundamental video blocks corresponding to recording and reproducing processes of said recording and reproducing system or a transmission and receiving processes of said transmission and receiving system, either one of said recording and reproducing system and said transmission and receiving system executing a reconstruction process for reconstructing a further video signal by collecting said fundamental video blocks from an inputted digital video signal composed of a plurality of frames without changing the positions of said fundamental video blocks in each of the frames, said scramble system comprising:

descramble means for descrambling respective fundamental video blocks in respective frames of an inputted scrambled digital video signal, and for generating a descrambled video signal, said descramble means executing the same descramble process as a descramble process executed on a first fundamental video block in a first frame, on a second fundamental video block in a second frame when the position of the second fundamental video block is equal to the position of the first fundamental video block in respective frames, wherein said descramble means executes said descramble process by reversely converting said scrambled video signal using the same block encryption method as that of scramble means for generating said scramble video signal.

23. The descramble apparatus as claimed in claim 22, wherein said inputted digital video signal includes;
(a) a DC component representing an average value of said inputted digital video signal of all pixels; and
(b) an AC component including a plurality of frequencies except for said DC component, and
wherein said descramble means descrambles a scramble video signal obtained by encrypting at least said DC component of said inputted digital video signal using said fundamental video blocks.

* * * * *